United States Patent
Jung et al.

(10) Patent No.: US 11,536,415 B2
(45) Date of Patent: Dec. 27, 2022

(54) VACUUM ADIABATIC BODY AND REFRIGERATOR

(71) Applicant: LG ELECTRONICS INC., Seoul (KR)

(72) Inventors: Wonyeong Jung, Seoul (KR); Deokhyun Youn, Seoul (KR); Jangseok Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/635,729

(22) PCT Filed: Jul. 31, 2018

(86) PCT No.: PCT/KR2018/008689
§ 371 (c)(1),
(2) Date: Jan. 31, 2020

(87) PCT Pub. No.: WO2019/027229
PCT Pub. Date: Feb. 7, 2019

(65) Prior Publication Data
US 2020/0182393 A1    Jun. 11, 2020

(30) Foreign Application Priority Data

Aug. 1, 2017    (KR) .......................... 10-2017-0097804

(51) Int. Cl.
*F25D 23/06*    (2006.01)
*F16L 59/065*    (2006.01)

(52) U.S. Cl.
CPC .......... *F16L 59/065* (2013.01); *F25D 23/061* (2013.01); *F25D 23/068* (2013.01); *F25D 2201/14* (2013.01)

(58) Field of Classification Search
CPC .. F25D 23/061; F25D 23/068; F25D 2201/14; F16L 59/065
USPC .............................................. 312/406, 406.1
See application file for complete search history.

(56) References Cited

U.S. PATENT DOCUMENTS

| | | | |
|---|---|---|---|
| 1,420,711 A | 6/1922 | Knutson | |
| 1,814,114 A | 7/1931 | Bodman | |
| 1,845,353 A * | 2/1932 | Snell | ..................... F25D 23/062 220/592.05 |

(Continued)

FOREIGN PATENT DOCUMENTS

| | | |
|---|---|---|
| CN | 2066123 | 11/1990 |
| CN | 1056276 | 11/1991 |

(Continued)

OTHER PUBLICATIONS

Australian Office Action dated Feb. 11, 2021 issued in AU Application No. 2018309538.

(Continued)

*Primary Examiner* — James O Hansen
(74) *Attorney, Agent, or Firm* — Ked & Associates

(57) ABSTRACT

A vacuum adiabatic body and a refrigerator are provided. The vacuum adiabatic body includes a support. The support includes a main support having a two-dimensional planar structure and crossing a space, and a first bar and a second bar, which respectively extend from both sides of the main support toward a first plate and a second plate, respectively.

17 Claims, 19 Drawing Sheets

(56) References Cited

U.S. PATENT DOCUMENTS

| | | |
|---|---|---|
| 2,000,882 A | 5/1935 | Comstock |
| 2,065,608 A | 12/1936 | Munters |
| 2,464,526 A | 3/1949 | Palmer |
| 2,989,156 A | 6/1961 | Brooks et al. |
| 3,156,975 A | 11/1964 | Shaw |
| 3,161,265 A | 12/1964 | Matsch et al. |
| 3,338,451 A | 8/1967 | Kesling |
| 3,936,553 A * | 2/1976 | Rowe .................... E04B 1/806 428/81 |
| 4,545,211 A | 10/1985 | Gaus |
| 4,545,213 A | 10/1985 | Fujiwara et al. |
| 4,705,099 A | 11/1987 | Taniguchi et al. |
| 4,732,432 A | 3/1988 | Keil |
| 4,826,040 A | 5/1989 | Jahr, Jr. et al. |
| 4,837,388 A | 6/1989 | Kugelmann |
| 5,011,729 A | 4/1991 | Mcallister |
| 5,157,893 A | 10/1992 | Benson et al. |
| 5,500,305 A | 3/1996 | Bridges |
| 5,720,536 A | 2/1998 | Jenkins et al. |
| 5,860,594 A | 1/1999 | Reason et al. |
| 6,038,830 A | 3/2000 | Hirath et al. |
| 6,393,798 B1 | 5/2002 | Hirath et al. |
| 6,769,265 B1 | 8/2004 | Davis |
| 7,571,582 B2 | 8/2009 | Hirai et al. |
| 7,891,203 B1 | 2/2011 | Burns et al. |
| 8,752,921 B2 | 6/2014 | Görz et al. |
| 8,765,247 B2 | 7/2014 | Park |
| 8,822,006 B2 | 9/2014 | Yoon et al. |
| 9,170,046 B2 * | 10/2015 | Jung .................... F25D 23/065 |
| 10,274,247 B2 | 4/2019 | Jeong et al. |
| 10,337,788 B2 | 7/2019 | Jung et al. |
| 10,543,560 B2 | 1/2020 | Nakakura et al. |
| 10,639,743 B2 | 5/2020 | Azuma et al. |
| 10,753,669 B2 | 8/2020 | Dherde et al. |
| 10,760,849 B2 | 9/2020 | Jung et al. |
| 10,823,485 B2 | 11/2020 | Lv et al. |
| 10,837,696 B2 | 11/2020 | Jung et al. |
| 10,899,264 B2 | 1/2021 | Jung et al. |
| 10,907,887 B2 | 2/2021 | Jung et al. |
| 10,913,232 B2 | 2/2021 | Dye et al. |
| 10,941,974 B2 | 3/2021 | Jung et al. |
| 11,047,616 B2 | 6/2021 | Jeong et al. |
| 2002/0041134 A1 | 4/2002 | Wolf et al. |
| 2002/0056184 A1 | 5/2002 | Richardson et al. |
| 2004/0080122 A1 | 4/2004 | Beyrle |
| 2004/0226956 A1 | 11/2004 | Brooks |
| 2005/0053755 A1 | 3/2005 | Markey |
| 2009/0007587 A1 | 1/2009 | Lanzl et al. |
| 2010/0071384 A1 | 3/2010 | Lu |
| 2010/0251653 A1 | 10/2010 | Mills |
| 2010/0252698 A1 | 10/2010 | Dye et al. |
| 2011/0204065 A1 | 8/2011 | Kolowich |
| 2011/0241513 A1 | 10/2011 | Nomura |
| 2012/0103006 A1 | 5/2012 | Jung et al. |
| 2012/0104923 A1 | 5/2012 | Jung et al. |
| 2012/0128920 A1 | 5/2012 | Yoon et al. |
| 2012/0196059 A1 | 8/2012 | Fujimori |
| 2013/0105494 A1 * | 5/2013 | Jung .................... F25D 23/062 220/592.05 |
| 2013/0105495 A1 | 5/2013 | Jung |
| 2013/0111942 A1 | 5/2013 | Jung |
| 2013/0200084 A1 | 8/2013 | Jung et al. |
| 2013/0230684 A1 | 9/2013 | Shinoki et al. |
| 2014/0322481 A1 | 10/2014 | Song et al. |
| 2015/0044412 A1 | 2/2015 | Miyaji et al. |
| 2016/0109172 A1 | 4/2016 | Kim et al. |
| 2016/0258671 A1 | 9/2016 | Allard et al. |
| 2018/0017314 A1 | 1/2018 | Jeong et al. |
| 2018/0216872 A1 | 8/2018 | Jung et al. |
| 2018/0216873 A1 | 8/2018 | Jung et al. |
| 2018/0224052 A1 | 8/2018 | Jung et al. |
| 2018/0224193 A1 | 8/2018 | Jung et al. |
| 2018/0224194 A1 | 8/2018 | Jung et al. |
| 2018/0224195 A1 | 8/2018 | Jung et al. |
| 2018/0224196 A1 | 8/2018 | Jung et al. |
| 2018/0224197 A1 | 8/2018 | Jeong et al. |
| 2018/0224198 A1 | 8/2018 | Jung et al. |
| 2018/0231298 A1 | 8/2018 | Jung et al. |
| 2018/0231300 A1 | 8/2018 | Jung et al. |
| 2018/0238486 A1 | 8/2018 | Jung et al. |
| 2018/0238610 A1 | 8/2018 | Jung et al. |
| 2018/0356147 A1 | 12/2018 | Jung et al. |
| 2019/0255980 A1 | 8/2019 | Jung et al. |
| 2020/0182393 A1 | 6/2020 | Jung et al. |
| 2021/0140704 A1 | 5/2021 | Kim et al. |

FOREIGN PATENT DOCUMENTS

| | | |
|---|---|---|
| CN | 1276055 | 12/2000 |
| CN | 1276056 | 12/2000 |
| CN | 2691933 | 4/2005 |
| CN | 2720362 | 8/2005 |
| CN | 102121781 | 7/2011 |
| CN | 102455103 | 5/2012 |
| CN | 102455105 | 5/2012 |
| CN | 103090616 | 5/2013 |
| CN | 104204646 | 12/2014 |
| CN | 104296490 | 1/2015 |
| CN | 104457117 | 3/2015 |
| CN | 104482707 | 4/2015 |
| CN | 104833157 | 8/2015 |
| CN | 104913571 | 9/2015 |
| CN | 205350719 | 6/2016 |
| CN | 106016957 | 10/2016 |
| CN | 205784134 | 12/2016 |
| CN | 106500428 | 3/2017 |
| CN | 106766594 | 5/2017 |
| CN | 107257907 | 10/2017 |
| CN | 107923701 | 4/2018 |
| CN | 208281706 | 12/2018 |
| CN | 208472996 | 2/2019 |
| CN | 109403210 | 3/2019 |
| DE | 10 2011 050472 | 11/2011 |
| EP | 1 564 513 | 8/2005 |
| EP | 2462372 | 10/2016 |
| GB | 890372 | 2/1962 |
| JP | S 60-179344 | 9/1985 |
| JP | 01-142379 | 6/1989 |
| JP | 01-179882 | 7/1989 |
| JP | H05-9298 | 2/1993 |
| JP | H07-091591 | 4/1995 |
| JP | 2001-277396 | 10/2001 |
| JP | 2002-071088 | 3/2002 |
| JP | 2002-221295 | 8/2002 |
| JP | 2003-042388 | 2/2003 |
| JP | 2004-211376 | 7/2004 |
| JP | 2006-082604 | 3/2006 |
| JP | 2012-021615 | 2/2012 |
| JP | 2012-207682 | 10/2012 |
| JP | 2013-007439 | 1/2013 |
| JP | 2013-189996 | 9/2013 |
| JP | 5316672 | 10/2013 |
| JP | 2014-051993 | 3/2014 |
| KR | 10-2001-0073363 | 8/2001 |
| KR | 10-0343719 | 7/2002 |
| KR | 10-0363646 | 11/2002 |
| KR | 20-0303619 | 2/2003 |
| KR | 10-2004-0002175 | 1/2004 |
| KR | 10-2004-0042682 | 5/2004 |
| KR | 10-2007-0037274 | 4/2007 |
| KR | 10-0845153 | 7/2008 |
| KR | 10-2010-0109653 | 10/2010 |
| KR | 10-2011-0015327 | 2/2011 |
| KR | 10-2011-0113414 | 11/2011 |
| KR | 10-2012-0139648 | 12/2012 |
| KR | 10-2013-0084561 | 7/2013 |
| KR | 10-1456376 | 10/2014 |
| KR | 10-2015-0012712 | 2/2015 |
| KR | 10-2015-0109727 | 8/2015 |
| KR | 10-2016-0079278 | 7/2016 |
| KR | 20-2017-0000187 | 1/2017 |
| KR | 10-2017-0016190 | 2/2017 |
| KR | 10-2017-0016244 | 2/2017 |
| KR | 10-2017-0071623 | 6/2017 |

(56) References Cited

FOREIGN PATENT DOCUMENTS

| | | |
|---|---|---|
| KR | 10-2018-0095281 | 8/2018 |
| RU | 2073285 | 2/1997 |
| RU | 2252377 | 5/2005 |
| RU | 2496063 | 10/2013 |
| RU | 2553251 | 6/2015 |
| RU | 2608791 | 1/2017 |
| RU | 2 627 067 | 8/2017 |
| WO | WO 91/19867 | 12/1991 |
| WO | WO 01/04553 | 1/2001 |
| WO | WO 02/069673 | 9/2002 |
| WO | WO 2012/176880 | 12/2012 |
| WO | WO 2016/105019 | 6/2016 |
| WO | WO 2017/023072 | 2/2017 |
| WO | WO 2017/023073 | 2/2017 |
| WO | WO 2017/023075 | 2/2017 |
| WO | WO 2017/023076 | 2/2017 |
| WO | WO 2017/023077 | 2/2017 |
| WO | WO 2017/023087 | 2/2017 |
| WO | WO 2017/023088 | 2/2017 |
| WO | WO 2017/023089 | 2/2017 |
| WO | WO 2017/023090 | 2/2017 |
| WO | WO 2017/023094 | 2/2017 |
| WO | WO 2017/023095 | 2/2017 |
| WO | WO 2017/023097 | 2/2017 |
| WO | WO 2017/023100 | 2/2017 |
| WO | WO 2017/023102 | 2/2017 |
| WO | WO 2017/105030 | 6/2017 |

OTHER PUBLICATIONS

European Search Report dated Mar. 24, 2021 issued in EP Application No. 18842051.7.
Chinese Office Action dated Dec. 9, 2020 issued in Application No. 201880050202.3.
International Search Report and Written Opinion dated Nov. 23, 2018 issued in Application No. PCT/KR2018/008689.
European Search Report issued in Application No. 18840183.0 dated Mar. 29, 2021.
U.S. Appl. No. 16/535,793, filed Jan. 31, 2020.
International Search Report and Written Opinion dated Nov. 8, 2018 issued in Application No. PCT/KR2018/008687.
International Search Report and Written Opinion dated Nov. 21, 2018 issued in Application No. PCT /KR2018/008691.
International Search Report and Written Opinion dated Nov. 23, 2018 issued in Application No. PCT/KR2018/008694.
International Search Report and Written Opinion dated Nov. 29, 2018 issued in Application No. PCT/KR2018/008698.
Chinese Office Action dated Dec. 2, 2020 issued in Application No. 201880050497.4.
Russian Office Action dated Sep. 18, 2020 issued in Application No. 2020110370/12.
U.S. Office Action dated May 3, 2021 issued in U.S. Appl. No. 16/635,793.
Australian Examination Report dated Feb. 17, 2021 issued in Application No. 2018309544.
European Search Report dated Mar. 24, 2021 issued in Application No. 18846385.5.
European Search Report dated Mar. 24, 2021 issued in Application No. 18840407.3.
Russian Office Action dated Jun. 22, 2020 issued in RU Application No. 2020108484.
Chinese Office Action dated Dec. 9, 2020 issued in CN Application No. 201880053044.7.
Australian Office Action dated Mar. 9, 2021 issued in AU Application No. 2018309541.
European Search Report dated Mar. 30, 2021 issued in EP Application No. 18840503.9.
Russian Office Action dated Feb. 20, 2021.
Chinese Office Action dated Feb. 1, 2021 issued in CN Application No. 201880050501.7.
European Search Report issued in Application No. 18840899.1 dated Apr. 7, 2021.
United States Office Action dated Sep. 27, 2021 issued in co-pending related U.S. Appl. No. 16/637,861.
U.S. Appl. No. 16/635,793, filed Jan. 31, 2020.
United States Office Action dated Oct. 29, 2021 issued in co-pending related U.S. Appl. No. 16/635,776.
Chinese Office Action dated Sep. 3, 2021 issued in CN Application No. 201880050572.7.
Chinese Office Action dated Sep. 28, 2021 issued in CN Application No. 201880050571.2.
Korean Office Action dated Dec. 21, 2021 issued in KR Application No. 10-2017-0097793.
Korean Office Action dated Dec. 21, 2021 issued in KR Application No. 10-2017-0097804.
Korean Office Action dated Dec. 24, 2021 issued in KR Application No. 10-2017-0097831.
U.S. Final Office Action dated Mar. 21, 2022 issued in U.S. Appl. No. 16/635,776.
U.S. Office Action issued in U.S. Appl. No. 16/635,758 dated Mar. 30, 2022.
Russian Office Action dated Mar. 9, 2022 issued in RU Application No. 2020142423.
Chinese Office Action dated Apr. 15, 2022 issued in CN Application No. 201880050571.2.
U.S. Appl. No. 16/635,699, filed Jan. 31, 2020.
U.S. Appl. No. 16/635,758, filed Jan. 31, 2020.
U.S. Appl. No. 16/635,776, filed Jan. 31, 2020.
U.S. Appl. No. 17/583,566, filed Jan. 25, 2022.
U.S. Appl. No. 16/637,861, filed Feb. 10, 2020.
Chinese Office Action issued in Application No. 202110908473.1 dated Jul. 5, 2022.
Chinese Office Action issued in Application No. 202110909689.X dated Jul. 12, 2022.
Korean Office Action dated Jul. 23, 2022 issued in Application No. 10-2017-0103444.
United States Office Action dated Sep. 21, 2022 issued in co-pending related U.S. Appl. No. 16/635,758.

* cited by examiner

FIG. 4

| Group | General plastic | | | | Engineering plastic | | | |
|---|---|---|---|---|---|---|---|---|
| Material | (HD)PE ※G-Plastic Reference | PC | Glass fiber PC (30% Glass-F) | ※Low outgassing PC | PCTFE | PPS | LCP | PEEK |
| Out-gassing rate (TML(%)) | 0.58 | 0.19 | 0.14 | No Data | 0.01 | 0.06 | 0.06 | 0.26 |
| Compressive Strength (MPa) | 31.7 | 82.8 | 124.1 | *80.6 | 37.9 | 107.0 | * 151.1 | 137.9 |
| Thermal Conductivity (W/m-k) | <0.40 | 0.18 | 0.18 | 0.18 | 0.20 | 0.3 | 0.36 (G/F 50%) | 0.25 |
| Strength /Cond. (MPa-m-k/W) | 79 | 460 | 689 | 448 | 189 | 357 | 420 | 552 |
| Heat Deflection Temp at 264 psi (℃) | 80 | 132 | 146 | 125 | 126 | 121 | 105 ~ 260 | 160 |
| Max Operating Temperature (℃) | 82 | 121 | 132 | No Data | 132 | 218 | No Data | 249 |
| *Cost(per 1kg) | Low | $3.1 | $6.2(G/F20%) | $6.7 | High | $30 | $40 | $150 |

FIG. 12
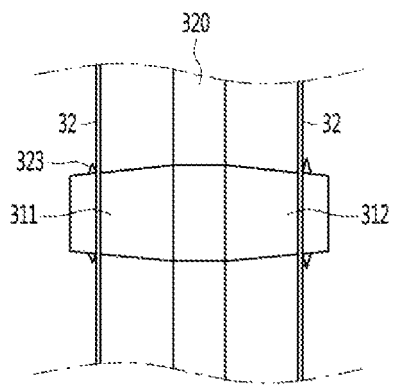
FIG. 13A          FIG. 13B
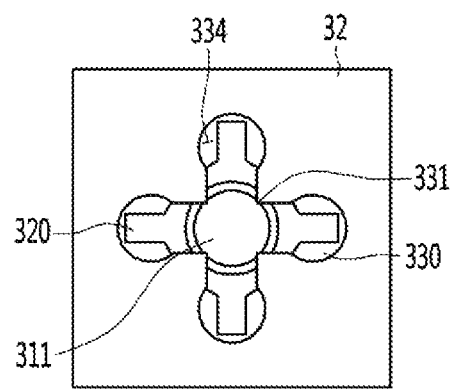   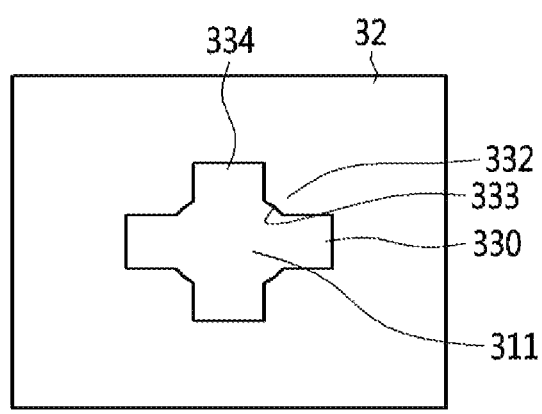
FIG. 13C          FIG. 13D
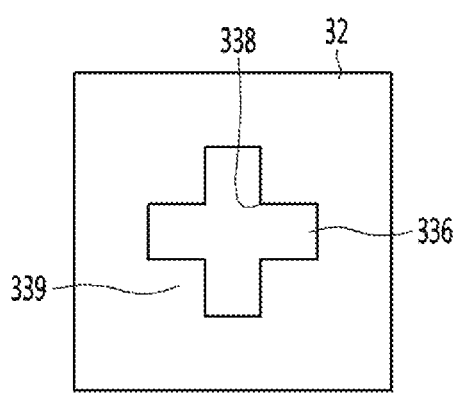   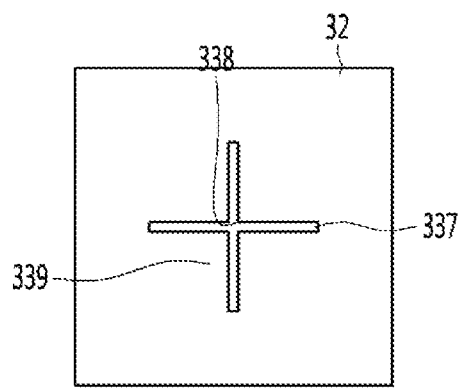

VACUUM ADIABATIC BODY AND REFRIGERATOR

This application is a U.S. National Stage Application under 35 U.S.C. § 371 of PCT Application No. PCT/KR2018/008689, filed Jul. 31, 2018, which claims priority to Korean Patent Application No. 10-2017-0097804, filed Aug. 1, 2017, whose entire disclosures are hereby incorporated by reference.

BACKGROUND

Field

A vacuum adiabatic body and a refrigerator are disclosed herein.

BACKGROUND

A vacuum adiabatic body is a product for suppressing heat transfer by vacuumizing an interior of a body thereof. The vacuum adiabatic body may reduce heat transfer by convection and conduction, and hence is applied to heating apparatuses and refrigerating apparatuses. In a typical adiabatic method applied to a refrigerator, although it is differently applied in refrigeration and freezing, a foam urethane adiabatic wall having a thickness of about 30 cm or more is generally provided. However, an internal volume of the refrigerator is therefore reduced.

In order to increase the internal volume of a refrigerator, there is an attempt to apply a vacuum adiabatic body to the refrigerator.

First, Korean Patent No. 10-0343719 (Reference Document 1) of the present applicant has been disclosed. According to Reference Document 1, there is disclosed a method in which a vacuum adiabatic panel is prepared and then built in walls of a refrigerator, and an exterior of the vacuum adiabatic panel is finished with a separate molding as Styrofoam. According to the method, additional foaming is not required, and adiabatic performance of the refrigerator is improved. However, fabrication cost is increased, and a fabrication method is complicated. As another example, a technique of providing walls using a vacuum adiabatic material and additionally providing adiabatic walls using a foam filling material has been disclosed in Korean Patent Publication No. 10-2015-0012712 (Reference Document 2). According to Reference Document 2, fabrication cost is increased, and a fabrication method is complicated.

As further another example, there is an attempt to fabricate all walls of a refrigerator using a vacuum adiabatic body that is a single product. For example, a technique of providing an adiabatic structure of a refrigerator to be in a vacuum state has been disclosed in U.S. Patent Publication No. 2004/0226956A1 (Reference Document 3). However, it is difficult to obtain a practical level of an adiabatic effect by providing a wall of the refrigerator with sufficient vacuum. In detail, there are limitations in that it is difficult to prevent a heat transfer phenomenon at a contact portion between an outer case and an inner case having different temperatures, it is difficult to maintain a stable vacuum state, and it is difficult to prevent deformation of a case due to a negative pressure of the vacuum state. Due to these limitations, the technology disclosed in Reference Document 3 is limited to a cryogenic refrigerator, and does not provide a level of technology applicable to general households.

The present applicant had filed Patent Application No. 10-2011-0113414 (Reference Document 4) in consideration of the above-described limitations. Reference Document 4 proposes a refrigerator including a vacuum adiabatic body. Particularly, a space maintenance member for installing a radiation resistance sheet is built.

According to the document, it is difficult to install the radiation resistance sheet in a supporting unit, particularly, when the radiation resistance sheet is inserted, the space maintenance member for maintaining a space has to be separately inserted. In addition, as a member made of a resin material is used, a weight, cost, and outgassing increase. Further, as the space maintenance member having a predetermined thickness has to be installed, there is a limitation in securing an adiabatic thickness of the vacuum adiabatic body.

Embodiments provide a vacuum adiabatic body, which is improved in low moldability occurring when a resin material having low outgassing is used, and a refrigerator. Embodiments also provide a vacuum adiabatic body, which is convenient in installation of a radiation resistance sheet in a supporting unit, and a refrigerator. Embodiments also provide a vacuum adiabatic body, which prevents a supporting unit from being damaged, and a refrigerator.

In order to improve low moldability of a supporting unit, the supporting unit may include a two-dimensional planar structure and crossing the third space and a left bar and a right bar, which respectively extend from both sides of the support to the plate member. The left bar and the right bar may have a same length.

In order to conveniently install a radiation resistance sheet to the supporting unit, the radiation resistance sheet may be supported by at least one of the left bar, the right bar, and the support. In order to prevent the supporting unit from being damaged, an insertion guide may be coupled to the bar. A surface of the insertion guide may have a low frictional structure.

The details of one or more embodiments are set forth in the accompanying drawings and the description below. Other features will be apparent from the description and drawings, and from the claims.

According to embodiments, the supporting unit may be well maintained in a design shape. Thus, completeness of the product may increase.

According to embodiments, the radiation resistance sheet may be conveniently installed. According to embodiments, damage to the supporting unit may be reduced to improve yield of the product.

BRIEF DESCRIPTION OF DRAWINGS

FIG. 4 is a diagram illustrating results obtained by examining resins;

FIGS. 11A-11B are views for explaining a manner in which a radiation resistance sheet is supported by a lattice support, wherein FIG. 11A is a view illustrating a coupling manner and FIG. 11B is a view illustrating an insert injection manner;

FIG. 12 is a view illustrating an example in which the radiation resistance sheet is fixed to a left bar and/or a right bar according to an embodiment;

FIGS. 13A-13D are plan views illustrating an example in which a radiation resistance sheet is fixed to a bar according to another embodiment;

DETAILED DESCRIPTION

Hereinafter, exemplary embodiments will be described with reference to the accompanying drawings. The embodiments may, however, be embodied in many different forms and should not be construed as being limited to the embodiments set forth herein, and a person of ordinary skill in the art, who understands the spirit, may readily implement other embodiments included within the scope of the same concept by adding, changing, deleting, and adding components; rather, it will be understood that they are also included within the scope.

The drawings shown below may be displayed differently from the actual product, or exaggerated or simple or detailed parts may be deleted, but this is intended to facilitate understanding of the technical idea. It should not be construed as limited.

In the following description, the term vacuum pressure means any pressure state lower than atmospheric pressure. In addition, the expression that a vacuum degree of A is higher than that of B means that a vacuum pressure of A is lower than that of B.

Figure 1:
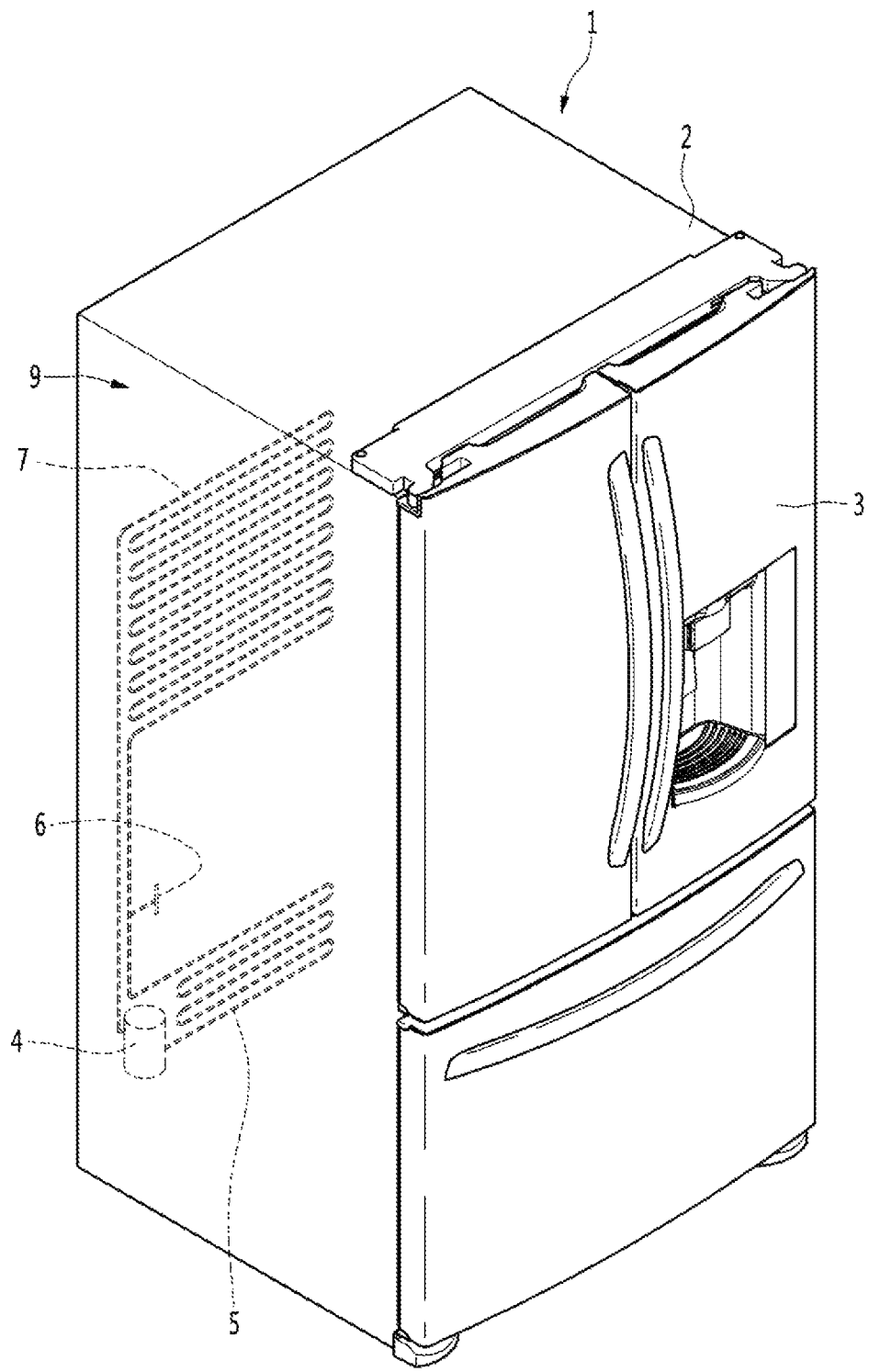
FIG. 1 is a perspective view of a refrigerator according to an embodiment.

FIG. 1 is a perspective view of a refrigerator according to an embodiment. Referring to FIG. 1, the refrigerator 1 includes a main body 2 provided with a cavity 9 capable of storing storage goods and a door 3 provided to open/close the main body 2. The door 3 may be rotatably or slidably movably disposed to open/close the cavity 9. The cavity 9 may provide at least one of a refrigerating compartment or a freezing compartment.

Parts constituting a freezing cycle in which cold air is supplied into the cavity 9. In detail, the parts include a compressor 4 that compresses a refrigerant, a condenser 5 that condenses the compressed refrigerant, an expander 6 that expands the condensed refrigerant, and an evaporator 7 that evaporates the expanded refrigerant to take heat. As a typical structure, a fan may be installed at a position adjacent to the evaporator 7, and a fluid blown from the fan may pass through the evaporator 7 and then be blown into the cavity 9. A freezing load is controlled by adjusting a blowing amount and blowing direction by the fan, adjusting an amount of a circulated refrigerant, or adjusting a compression rate of the compressor, so that it is possible to control a refrigerating space or a freezing space.

Figure 2:
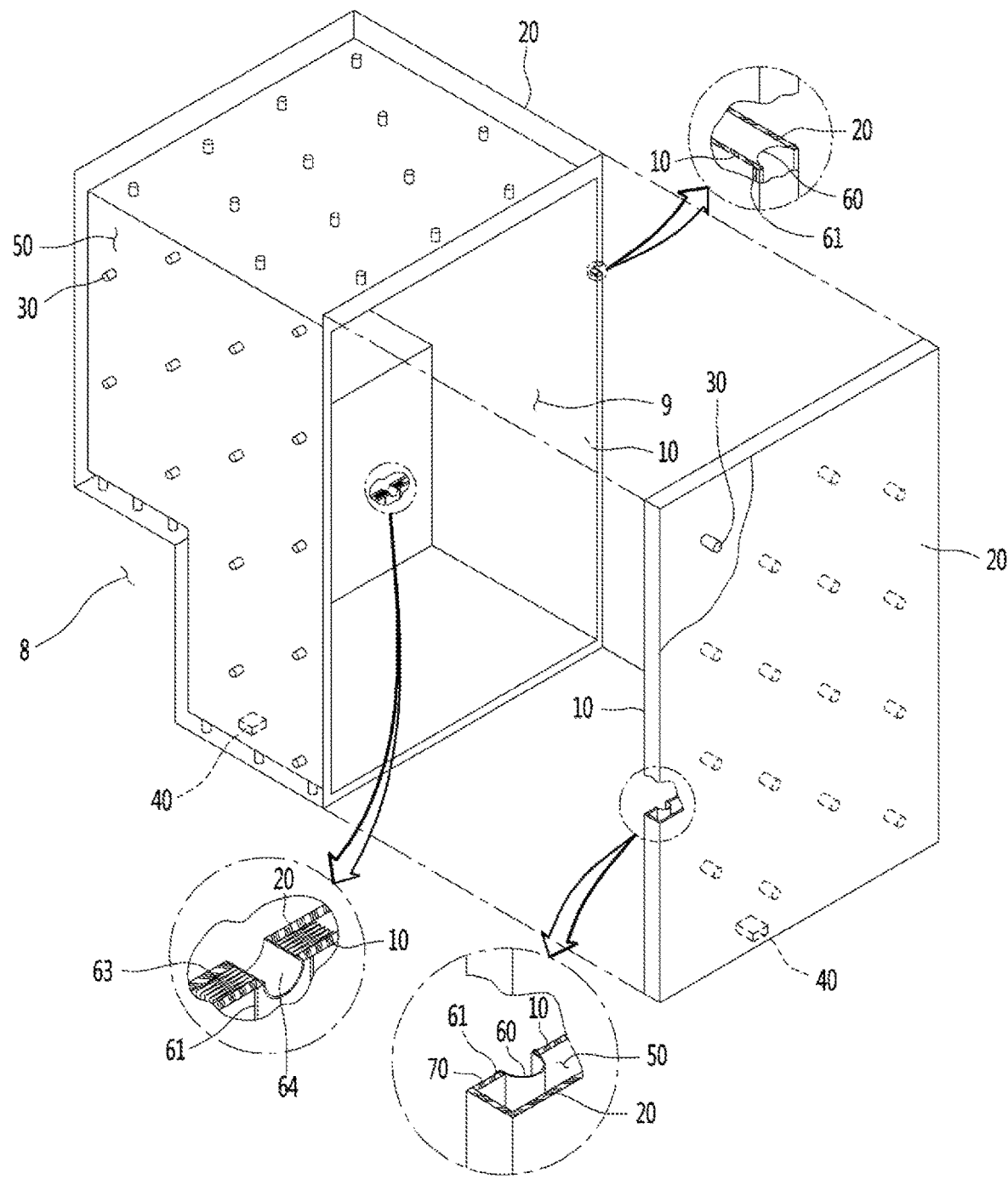
FIG. 2 is a view schematically showing a vacuum adiabatic body used in a main body and a door of the refrigerator.

FIG. 2 is a view schematically showing a vacuum adiabatic body used in the main body and the door of the refrigerator. In FIG. 2, a main body-side vacuum adiabatic body is illustrated in a state in which top and side walls are removed, and a door-side vacuum adiabatic body is illustrated in a state in which a portion of a front wall is removed. In addition, sections of portions at conductive resistance sheets are schematically illustrated for convenience of understanding.

Referring to FIG. 2, the vacuum adiabatic body includes a first plate member (first plate) 10 for providing a wall of a low-temperature space, a second plate member (second plate) 20 for providing a wall of a high-temperature space, a vacuum space part (vacuum space) 50 defined as an interval part between the first and second plate members 10 and 20. Also, the vacuum adiabatic body includes conductive resistance sheets 60 and 63 for preventing heat conduction between the first and second plate members 10 and 20. A sealing part (sealing) 61 for sealing the first and second plate members 10 and 20 is provided such that the vacuum space part 50 is in a sealed state. When the vacuum adiabatic body is applied to a refrigerating or heating cabinet, the first plate member 10 may be referred to as an inner case, and the second plate member 20 may be referred to as an outer case. A machine room 8 in which parts providing a freezing cycle are accommodated is placed at a lower rear side of the main body-side vacuum adiabatic body, and an exhaust port 40 for forming a vacuum state by exhausting air in the vacuum space part 50 is provided at any one side of the vacuum adiabatic body. In addition, a pipeline 64 passing through the vacuum space part 50 may be further installed so as to install a defrosting water line and electric lines.

The first plate member 10 may define at least one portion of a wall for a first space provided thereto. The second plate member 20 may define at least one portion of a wall for a second space provided thereto. The first space and the second space may be defined as spaces having different temperatures. The wall for each space may serve as not only a wall directly contacting (facing) the space but also a wall not contacting (facing) the space. For example, the vacuum adiabatic body of the embodiment may also be applied to a product further having a separate wall contacting (facing) each space.

Factors of heat transfer, which cause loss of the adiabatic effect of the vacuum adiabatic body, are heat conduction between the first and second plate members 10 and 20, heat radiation between the first and second plate members 10 and 20, and gas conduction of the vacuum space part 50. Hereinafter, a heat resistance unit provided to reduce adiabatic loss related to the factors of the heat transfer will be provided. The vacuum adiabatic body and the refrigerator of the embodiment do not exclude that another adiabatic means is further provided to at least one side of the vacuum adiabatic body. Therefore, an adiabatic means using foaming, for example, may be further provided to another side of the vacuum adiabatic body.

Figure 3A:
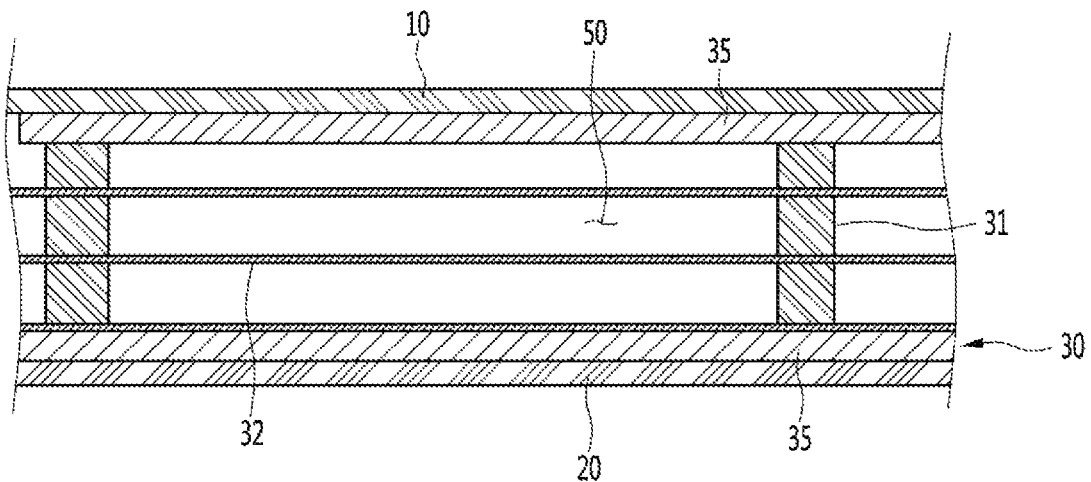
FIGS. 3A-3B are views illustrating various embodiments of an internal configuration of a vacuum space part.
Figure 3B:
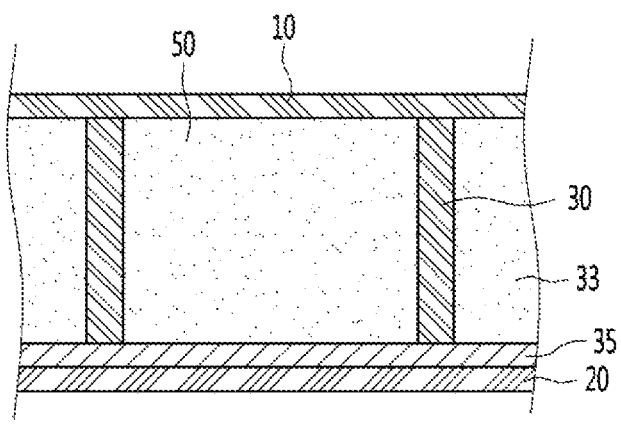

FIGS. 3A-32B are views illustrating various embodiments of an internal configuration of the vacuum space part. Referring to FIG. 3A, the vacuum space part 50 may be provided in a third space having a pressure different from that of each of the first and second spaces, for example, a vacuum state, thereby reducing adiabatic loss. The third space may be provided at a temperature between a temperature of the first space and a temperature of the second space. As the third space is provided as a space in the vacuum state, the first and second plate members 10 and 20 receive a force contracting in a direction in which they approach each other due to a force corresponding to a pressure difference between the first and second spaces. Therefore, the vacuum space part 50 may be deformed in a direction in which it is reduced. In this case, the adiabatic loss may be caused due to an increase in amount of heat radiation, caused by the contraction of the vacuum space part 50, and an increase in amount of heat conduction, caused by contact between the plate members 10 and 20.

A supporting unit (support) 30 may be provided to reduce deformation of the vacuum space part 50. The supporting unit 30 includes a bar 31. The bar 31 may extend in a substantially vertical direction with respect to the plate members to support a distance between the first plate member and the second plate member. A support plate 35 may be additionally provided on at least any one end of the bar 31. The support plate 35 may connect at least two or more bars 31 to each other to extend in a horizontal direction with respect to the first and second plate members 10 and 20. The support plate 35 may be provided in a plate shape or may be provided in a lattice shape so that an area of the support plate contacting the first or second plate member 10 or 20 decreases, thereby reducing heat transfer. The bars 31 and the support plate 35 are fixed to each other at at least one portion, to be inserted together between the first and second plate members 10 and 20. The support plate 35 contacts at least one of the first and second plate members 10 and 20, thereby preventing deformation of the first and second plate members 10 and 20. In addition, based on an extending direction of the bars 31, a total sectional area of the support plate 35 is provided to be greater than that of the bars 31, so that heat transferred through the bars 31 may be diffused through the support plate 35.

A material of the supporting unit 30 will be described hereinafter.

The supporting unit 30 is to have a high compressive strength so as to endure the vacuum pressure. Also, the supporting unit 30 is to have a low outgassing rate and a low water absorption rate so as to maintain the vacuum state. Further, the supporting unit 30 is to have a low thermal conductivity so as to reduce heat conduction between the plate members. Furthermore, the supporting unit 30 is to secure the compressive strength at a high temperature so as to endure a high-temperature exhaust process. Additionally, the supporting unit 30 is to have an excellent machinability so as to be subjected to molding. Also, the supporting unit 30 is to have a low cost for molding. A time required to perform the exhaust process takes about a few days. Hence, the time is reduced, thereby considerably improving fabrication cost and productivity. Therefore, the compressive strength is to be secured at the high temperature because an exhaust speed is increased as a temperature at which the exhaust process is performed becomes higher. The inventor has performed various examinations under the above-described conditions.

First, ceramic or glass has a low outgassing rate and a low water absorption rate, but its machinability is remarkably lowered. Hence, the ceramic and glass may not be used as the material of the supporting unit 30. Therefore, resin may be considered as the material of the supporting unit 30.

FIG. 4 is a diagram illustrating results obtained by examining resins. Referring to FIG. 4, the present inventor has examined various resins, and most of the resins cannot be used because their outgassing rates and water absorption rates are remarkably high. Accordingly, the present inventor has examined resins that approximately satisfy conditions of the outgassing rate and the water absorption rate. As a result, polyethylene resin (PE) is inappropriate to be used due to its high outgassing rate and its low compressive strength. Polychlorotrifluoroethylene (PCTFE) is not used due to its remarkably high price. Polyether ether ketone (PEEK) is inappropriate to be used due to its high outgassing rate. Accordingly, it is determined that that a resin selected from the group consisting of polycarbonate (PC), glass fiber PC, low outgassing PC, polyphenylene sulfide (PPS), and liquid crystal polymer (LCP) may be used as the material of the supporting unit. However, an outgassing rate of the PC is 0.19, which is at a low level. Hence, as the time required to perform baking in which exhaustion is performed by applying heat is increased to a certain level, the PC may be used as the material of the supporting unit.

The present inventor has found an optimal material by performing various studies on resins expected to be used inside the vacuum space part. Hereinafter, results of the performed studies will be described with reference to the accompanying drawings.

Figure 5:
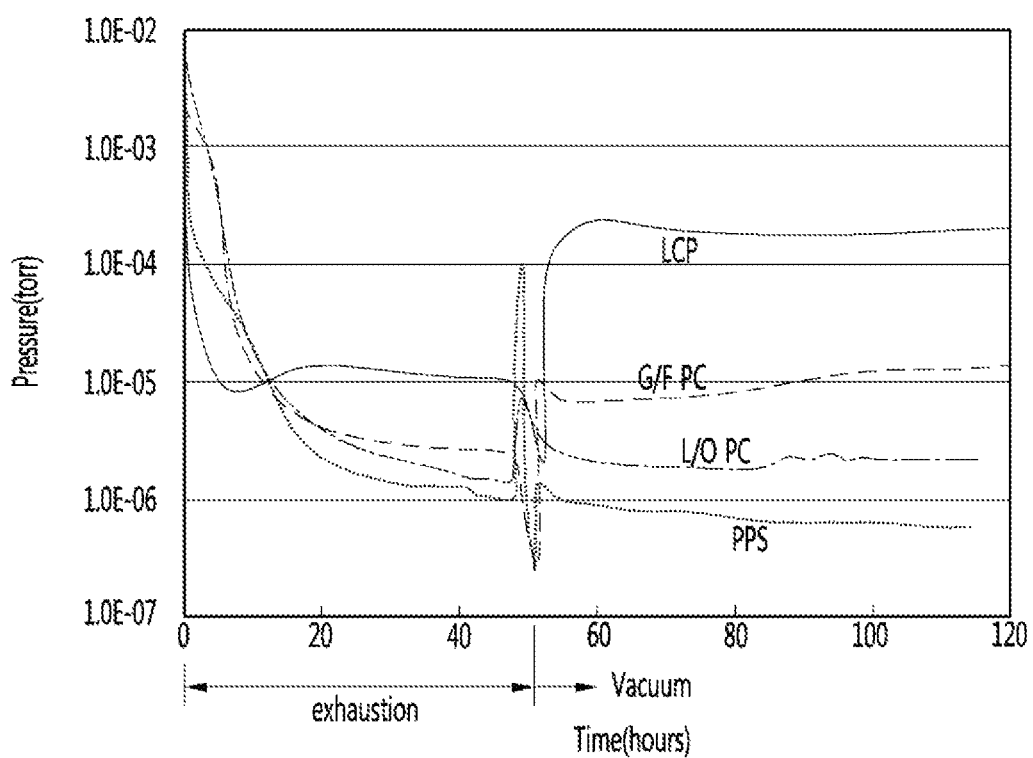
FIG. 5 illustrates results obtained by performing an experiment on vacuum maintenance performances of resins.

FIG. 5 is a view illustrating results obtained by performing an experiment on vacuum maintenance performances of the resins. Referring to FIG. 5, there is illustrated a graph showing results obtained by fabricating the supporting unit using the respective resins and then testing vacuum maintenance performances of the resins. First, a supporting unit fabricated using a selected material was cleaned using ethanol, left at a low pressure for 48 hours, exposed to air for 2.5 hours, and then subjected to an exhaust process at 90° C. for about 50 hours in a state that the supporting unit was put in the vacuum adiabatic body, thereby measuring a vacuum maintenance performance of the supporting unit.

It may be seen that in the case of the LCP, its initial exhaust performance is best, but its vacuum maintenance performance is bad. It may be expected that this is caused by sensitivity of the LCP to temperature. Also, it is expected through characteristics of the graph that, when a final allowable pressure is $5 \times 10^{-3}$ Torr, its vacuum performance will be maintained for a time of about 0.5 year. Therefore, the LCP is inappropriate as the material of the supporting unit.

It may be seen that, in the case of the glass fiber PC (G/F PC), its exhaust speed is fast, but its vacuum maintenance performance is low. It is determined that this will be influenced by an additive. Also, it is expected through the characteristics of the graph that the glass fiber PC will maintain its vacuum performance will be maintained under the same condition for a time of about 8.2 years. Therefore, the LCP is inappropriate as the material of the supporting unit.

It is expected that, in the case of the low outgassing PC (L/O PC), its vacuum maintenance performance is excellent, and its vacuum performance will be maintained under the same condition for a time of about 34 years, as compared with the above-described two materials. However, it may be seen that the initial exhaust performance of the low outgassing PC is low, and therefore, fabrication efficiency of the low outgassing PC is lowered.

It may be seen that, in the case of the PPS, its vacuum maintenance performance is remarkably excellent, and its exhaust performance is also excellent. Therefore, it is considered that, based on the vacuum maintenance performance, the PPS is used as the material of the supporting unit.

Figure 6A:
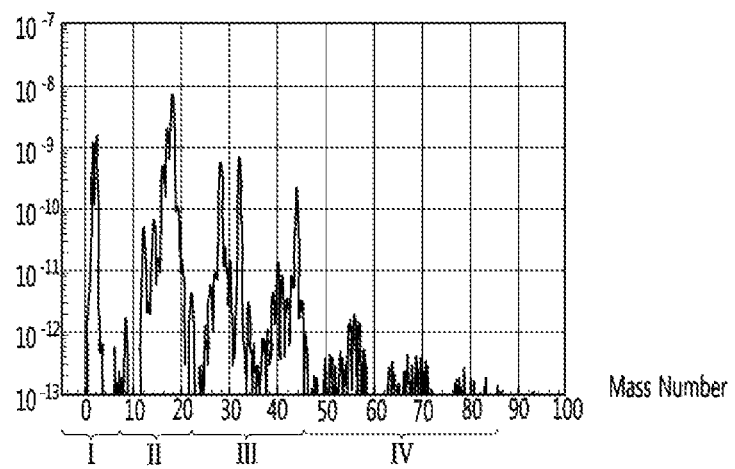
FIGS. 6A-6C are results obtained by analyzing components of gases discharged from polyphenylene sulfide (PPS) and low outgassing polycarbonate (PC)
Figure 6B:
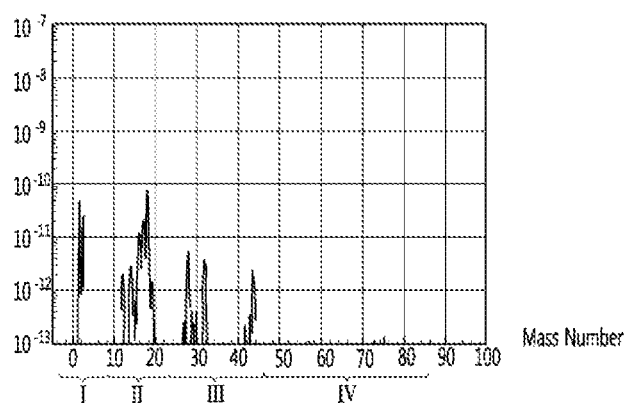
Figure 6C:
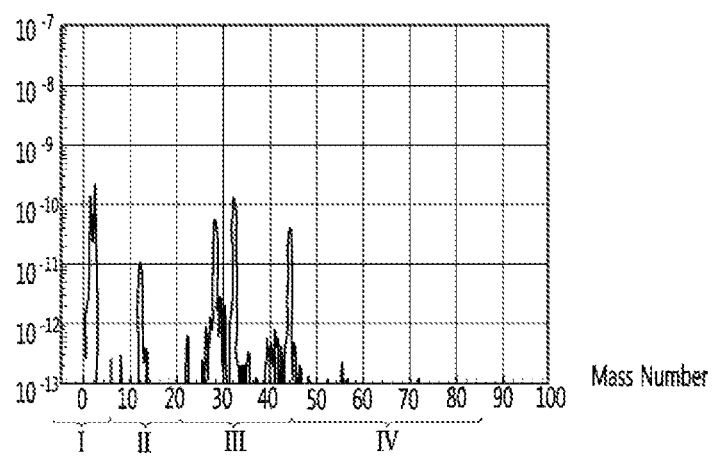

FIGS. 6A-6C illustrate results obtained by analyzing components of gases discharged from the PPS and the low outgassing PC, in which the horizontal axis represents mass numbers of gases and the vertical axis represents concentrations of gases. FIG. 6A illustrates a result obtained by analyzing a gas discharged from the low outgassing PC. In FIG. 6A, it may be seen that $H_2$ series (I), $H_2O$ series (II), $N_2/CO/CO_2/O_2$ series (III), and hydrocarbon series (IV) are equally discharged. FIG. 6B illustrates a result obtained by analyzing a gas discharged from the PPS. In FIG. 6B, it may be seen that $H_2$ series (I), $H_2O$ series (II), and $N_2/CO/CO_2/O_2$ series (III) are discharged to a weak extent. FIG. 6C is a result obtained by analyzing a gas discharged from stainless steel. In FIG. 6C, it may be seen that a similar gas to the PPS is discharged from the stainless steel. Consequently, it may be seen that the PPS discharges a similar gas to the stainless steel. As the analyzed result, it may be re-confirmed that the PPS is excellent as the material of the supporting unit.

Figure 7:
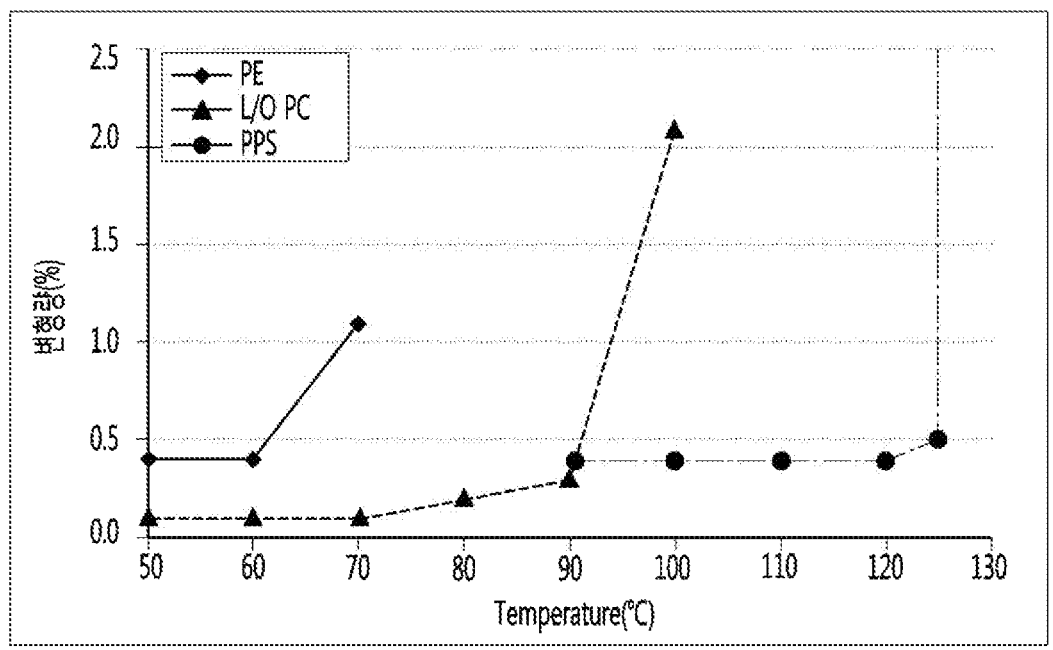
FIG. 7 illustrates results obtained by measuring maximum deformation temperatures at which resins are damaged by atmospheric pressure in high-temperature exhaustion.

FIG. 7 illustrates results obtained by measuring maximum deformation temperatures at which resins are damaged by atmospheric pressure in high-temperature exhaustion. The bars 31 were provided at a diameter of 2 mm at a distance of 30 mm. Referring to FIG. 7, it may be seen that a rupture occurs at 60° C. in the case of the PE, a rupture occurs at 90° C. in the case of the low outgassing PC, and a rupture occurs at 125° C. in the case of the PPS. As the analyzed result, it may be seen that the PPS is most used as the resin used inside of the vacuum space part. However, the low outgassing PC may be used in terms of fabrication cost.

A radiation resistance sheet 32 for reducing heat radiation between the first and second plate members 10 and 20 through the vacuum space part 50 will be described. The first and second plate members 10 and 20 may be made of a stainless material capable of preventing corrosion and providing a sufficient strength. The stainless material has a relatively high emissivity of 0.16, and hence a large amount of radiation heat may be transferred. In addition, the supporting unit 30 made of the resin has a lower emissivity than the plate members, and is not entirely provided to inner surfaces of the first and second plate members 10 and 20. Hence, the supporting unit 30 does not have great influence on radiation heat. Therefore, the radiation resistance sheet 32 may be provided in a plate shape over a majority of the area of the vacuum space part 50 so as to concentrate on reduction of radiation heat transferred between the first and second plate members 10 and 20. A product having a low emissivity may be used as the material of the radiation resistance sheet 32. In an embodiment, an aluminum foil having an emissivity of 0.02 may be used as the radiation resistance sheet 32. Also, as the transfer of radiation heat may not be sufficiently blocked using one radiation resistance sheet, at least two radiation resistance sheets 32 may be provided at a certain distance so as not to contact each other. Also, at least one radiation resistance sheet may be provided in a state in which it contacts the inner surface of the first or second plate member 10 or 20.

Referring back to FIG. 3B, a distance between the plate members is maintained by the supporting unit 30, and a porous material 33 may be filled in the vacuum space part 50. The porous material 33 may have a higher emissivity than the stainless material of the first and second plate members 10 and 20. However, as the porous material 33 is filled in the vacuum space part 50, the porous material 33 has a high efficiency for resisting the radiation heat transfer. In the present embodiment, the vacuum adiabatic body may be manufactured without the radiation resistance sheet 32.

Figure 8A:
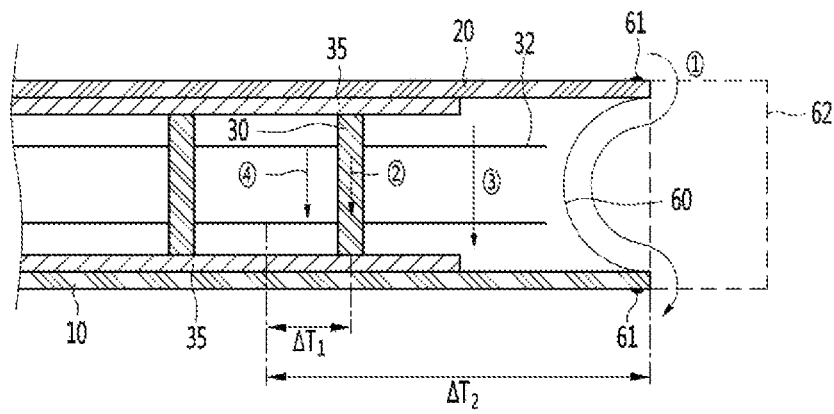
FIGS. 8A-8C are views showing various embodiments of conductive resistance sheets and peripheral parts thereof.
Figure 8B:
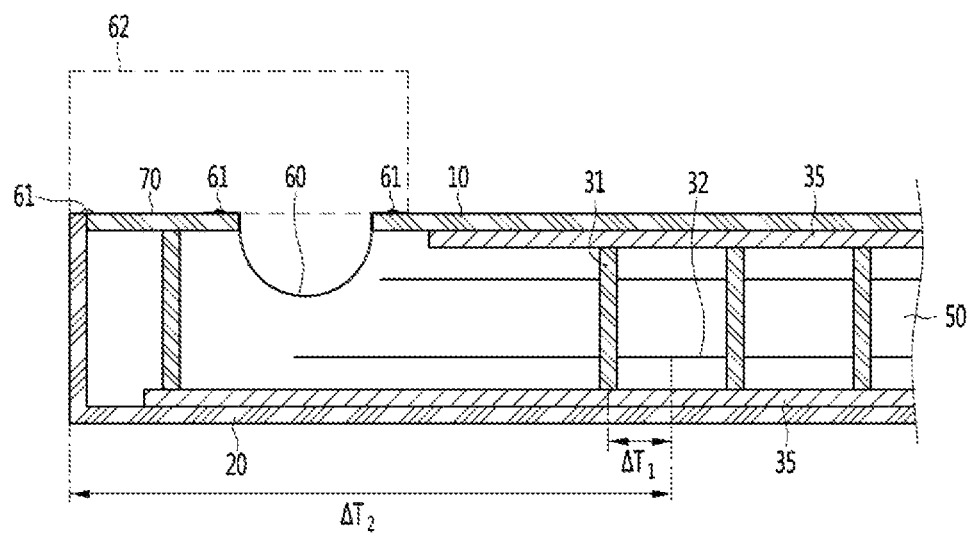
Figure 8C:
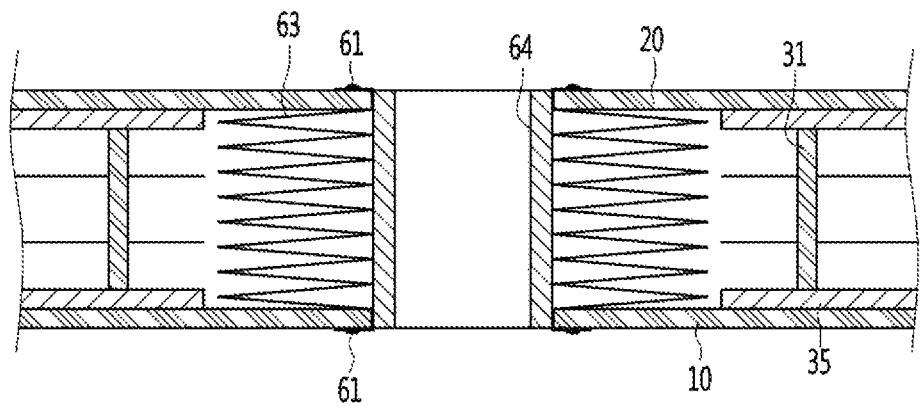

FIGS. 8A-8C are views showing various embodiments of conductive resistance sheets and peripheral parts thereof. Structures of the conductive resistance sheets are briefly illustrated in FIG. 2, but will be understood in detail with reference to the drawings.

First, a conductive resistance sheet proposed in FIG. 8A may be applied to the main body-side vacuum adiabatic body. Specifically, the first and second plate members 10 and 20 are to be sealed so as to vacuumize the interior of the vacuum adiabatic body. In this case, as the two plate members have different temperatures from each other, heat transfer may occur between the two plate members. Conductive resistance sheet 60 is provided to prevent heat conduction between two different kinds of plate members.

The conductive resistance sheet 60 may be provided with sealing parts 61 at which both ends of the conductive resistance sheet 60 are sealed to defining at least one portion of the wall for the third space and maintain the vacuum state. The conductive resistance sheet 60 may be provided as a thin foil in unit of micrometer so as to reduce the amount of heat conducted along the wall for the third space. The sealing parts 610 may be provided as welding parts. That is, the conductive resistance sheet 60 and the plate members 10 and 20 may be fused to each other. In order to cause a fusing action between the conductive resistance sheet 60 and the plate members 10 and 20, the conductive resistance sheet 60 and the plate members 10 and 20 may be made of the same material, and a stainless material may be used as the material. The sealing parts 610 are not limited to the welding parts, and may be provided through a process, such as cocking. The conductive resistance sheet 60 may be provided in a curved shape. Thus, a heat conduction distance of the conductive resistance sheet 60 is provided longer than a linear distance of each plate member, so that the amount of heat conduction may be further reduced.

A change in temperature occurs along the conductive resistance sheet 60. Therefore, in order to block heat transfer to the exterior of the conductive resistance sheet 60, a shielding part (shield) 62 may be provided at an exterior of the conductive resistance sheet 60 such that an adiabatic action occurs. In other words, in the refrigerator, the second plate member 20 has a high temperature and the first plate member 10 has a low temperature. In addition, heat conduction from high temperature to low temperature occurs in the conductive resistance sheet 60, and hence, the temperature of the conductive resistance sheet 60 is suddenly changed. Therefore, when the conductive resistance sheet 60 is opened to the exterior thereof, heat transfer through the opened place may seriously occur. In order to reduce heat loss, the shielding part 62 is provided at the exterior of the conductive resistance sheet 60. For example, when the conductive resistance sheet 60 is exposed to any one of the low-temperature space and the high-temperature space, the conductive resistance sheet 60 does not serve as a conductive resistor as well as the exposed portion thereof.

The shielding part 62 may be provided as a porous material contacting an outer surface of the conductive resistance sheet 60. The shielding part 62 may be provided as an adiabatic structure, e.g., a separate gasket, which is placed at the exterior of the conductive resistance sheet 60. The shielding part 62 may be provided as a portion of the vacuum adiabatic body, which is provided at a position facing a corresponding conductive resistance sheet 60 when the main body-side vacuum adiabatic body is closed with respect to the door-side vacuum adiabatic body. In order to reduce heat loss even when the main body and the door are opened, the shielding part 62 may be provided as a porous material or a separate adiabatic structure.

A conductive resistance sheet proposed in FIG. 8B may be applied to the door-side vacuum adiabatic body. In FIG. 8B, portions different from those of FIG. 8A are described, and the same description is applied to portions identical to those of FIG. 8A. A side frame 70 is further provided at an outside of the conductive resistance sheet 60. A part for sealing between the door and the main body, an exhaust port necessary for an exhaust process, a getter port for vacuum maintenance, for example, may be placed on the side frame 70. This is because mounting of parts is convenient in the main body-side vacuum adiabatic body, but mounting positions of parts are limited in the door-side vacuum adiabatic body.

In the door-side vacuum adiabatic body, it is difficult to place the conductive resistance sheet 60 at a front end portion (front end) of the vacuum space part, i.e., a corner side portion (corner side) of the vacuum space part. This is because, unlike the main body, a corner edge portion (corner edge) of the door is exposed to the exterior. More specifically, if the conductive resistance sheet 60 is placed at the front end portion of the vacuum space part, the corner edge portion of the door is exposed to the exterior, and hence, there is a disadvantage in that a separate adiabatic part should be configured so as to heat-insulate the conductive resistance sheet 60.

A conductive resistance sheet proposed in FIG. 8C may be installed in the pipeline passing through the vacuum space part. In FIG. 8C, portions different from those of FIGS. 8A and 8B are described, and the same description is applied to portions identical to those of FIGS. 8A and 8B. A conductive resistance sheet having the same shape as that of FIG. 8A, a wrinkled conductive resistance sheet 63 may be provided at a peripheral portion of the pipeline 64. Accordingly, a heat transfer path may be lengthened, and deformation caused by a pressure difference may be prevented. In addition, a separate shielding part may be provided to improve adiabatic performance of the conductive resistance sheet.

A heat transfer path between the first and second plate members 10 and 20 will be described with reference back to FIG. 8A. Heat passing through the vacuum adiabatic body may be divided into surface conduction heat conducted along a surface of the vacuum adiabatic body, more specifically, the conductive resistance sheet 60, supporter conduction heat conducted along the supporting unit 30 provided inside of the vacuum adiabatic body, gas conduction heat conducted through an internal gas in the vacuum space part, and radiation transfer heat transferred through the vacuum space part.

The transfer heat may be changed depending on various depending on various design dimensions. For example, the supporting unit may be changed such that the first and second plate members 10 and 20 may endure a vacuum pressure without being deformed, the vacuum pressure may be changed, a distance between the plate members may be changed, and a length of the conductive resistance sheet may be changed. The transfer heat may be changed depending on a difference in temperature between the spaces (the first and second spaces) respectively provided by the plate members. In the embodiment, a configuration of the vacuum adiabatic body has been found by considering that its total heat transfer amount is smaller than that of a typical adiabatic structure formed by foaming polyurethane. In a typical refrigerator including the adiabatic structure formed by foaming the polyurethane, an effective heat transfer coefficient may be proposed as 19.6 mW/mK.

By performing a relative analysis on heat transfer amounts of the vacuum adiabatic body of the embodiment, a heat transfer amount by the gas conduction heat may become smallest. For example, the heat transfer amount by the gas conduction heat may be controlled to be equal to or smaller than 4% of the total heat transfer amount. A heat transfer amount by solid conduction heat defined as a sum of the surface conduction heat and the supporter conduction heat is largest. For example, the heat transfer amount by the solid conduction heat may reach 75% of the total heat transfer amount. A heat transfer amount by the radiation transfer heat is transfer than the heat transfer amount by the solid conduction heat but larger than the heat transfer amount of the gas conduction heat. For example, the heat transfer amount by the radiation transfer heat may occupy about 20% of the total heat transfer amount.

According to such a heat transfer distribution, effective heat transfer coefficients (eK: effective K) (W/mK) of the surface conduction heat, the supporter conduction heat, the gas conduction heat, and the radiation transfer heat transfer may have an order of Math Equation 1.

$$eK_{solid\ conduction\ heat} > eK_{radiation\ transfer\ heat} > eK_{gas\ conduction\ heat}$$ [Equation 1]

Here, the effective heat transfer coefficient (eK) is a value that may be measured using a shape and temperature differences of a target product. The effective heat transfer coefficient (eK) is a value that may be obtained by measuring a total heat transfer amount and a temperature at least one portion at which heat is transferred. For example, a calorific value (W) is measured using a heating source that may be quantitatively measured in the refrigerator, a temperature distribution (K) of the door is measured using heats respectively transferred through a main body and an edge of the door of the refrigerator, and a path through which heat is transferred is calculated as a conversion value (m), thereby evaluating an effective heat transfer coefficient.

The effective heat transfer coefficient (eK) of the entire vacuum adiabatic body is a value given by k=QL/AΔT. Here, Q denotes a calorific value (W) and may be obtained using a calorific value of a heater. A denotes a sectional area (m2) of the vacuum adiabatic body, L denotes a thickness (m) of the vacuum adiabatic body, and ΔT denotes a temperature difference.

For the surface conduction heat, a conductive calorific value may be obtained through a temperature difference (ΔT) between an entrance and an exit of the conductive resistance sheet 60 or 63, a sectional area (A) of the conductive resistance sheet, a length (L) of the conductive resistance sheet, and a thermal conductivity (k) of the conductive resistance sheet (the thermal conductivity of the conductive resistance sheet is a material property of a material and may be obtained in advance). For the supporter conduction heat, a conductive calorific value may be obtained through a temperature difference (ΔT) between an entrance and an exit of the supporting unit 30, a sectional area (A) of the supporting unit, a length (L) of the supporting unit, and a thermal conductivity (k) of the supporting unit. Here, the thermal conductivity of the supporting unit is a material property of a material and may be obtained in advance. The sum of the gas conduction heat, and the radiation transfer heat may be obtained by subtracting the surface conduction heat and the supporter conduction heat from the heat transfer amount of the entire vacuum adiabatic body. A ratio of the gas conduction heat and the radiation transfer heat may be obtained by evaluating radiation transfer heat when no gas conduction heat exists by remarkably lowering a vacuum degree of the vacuum space part 50.

When a porous material is provided inside the vacuum space part 50, porous material conduction heat may be a sum of the supporter conduction heat and the radiation transfer heat. The porous material conduction heat may be changed depending on various variables including a kind, and an amount, for example, of the porous material.

According to an embodiment, a temperature difference $\Delta T1$ between a geometric center formed by adjacent bars 31 and a point at which each of the bars 31 is located may be provided to be less than 0.5. Also, a temperature difference $\Delta T2$ between the geometric center formed by the adjacent bars 31 and an edge portion of the vacuum adiabatic body may be provided to be less than 0.5. In the second plate member 20, a temperature difference between an average temperature of the second plate and a temperature at a point at which a heat transfer path passing through the conductive resistance sheet 60 or 63 meets the second plate may be largest. For example, when the second space is a region hotter than the first space, the temperature at the point at which the heat transfer path passing through the conductive resistance sheet meets the second plate member becomes lowest. Similarly, when the second space is a region colder than the first space, the temperature at the point at which the heat transfer path passing through the conductive resistance sheet meets the second plate member becomes highest.

This means that the amount of heat transferred through other points except the surface conduction heat passing through the conductive resistance sheet should be controlled, and the entire heat transfer amount satisfying the vacuum adiabatic body may be achieved only when the surface conduction heat occupies the largest heat transfer amount. To this end, a temperature variation of the conductive resistance sheet may be controlled to be larger than that of the plate member.

Physical characteristics of the parts constituting the vacuum adiabatic body will be described. In the vacuum adiabatic body, a force by vacuum pressure is applied to all of the parts. Therefore, a material having a strength (N/m2) of a certain level may be used.

Under such circumferences, the plate members 10 and 20 and the side frame 70 may be made of a material having a sufficient strength with which they are not damaged by even vacuum pressure. For example, when the number of bars 31 is decreased so as to limit support conduction heat, deformation of the plate member occurs due to the vacuum pressure, which may negatively influence the external appearance of refrigerator. The radiation resistance sheet 32 may be made of a material that has a low emissivity and may be easily subjected to thin film processing. Also, the radiation resistance sheet 32 is to ensure a sufficient strength so as not to be deformed by an external impact. The supporting unit 30 is provided with a strength sufficient to support the force of the vacuum pressure and endure an external impact, and is to have machinability. The conductive resistance sheet 60 may be made of a material that has a thin plate shape and may endure the vacuum pressure.

In an embodiment, the plate member, the side frame, and the conductive resistance sheet may be made of stainless materials having the same strength. The radiation resistance sheet may be made of aluminum having a weaker strength that the stainless materials. The supporting unit may be made of resin having a weaker strength than the aluminum.

Unlike the strength from the point of view of materials, analysis from the point of view of stiffness is required. The stiffness (N/m) is a property that would not be easily deformed. Although the same material is used, its stiffness may be changed depending on its shape. The conductive resistance sheets 60 or 63 may be made of a material having a strength, but the stiffness of the material is low so as to increase heat resistance and minimize radiation heat as the conductive resistance sheet is uniformly spread without any roughness when the vacuum pressure is applied. The radiation resistance sheet 32 requires a stiffness of a certain level so as not to contact another part due to deformation. Particularly, an edge portion of the radiation resistance sheet may generate conduction heat due to drooping caused by the self-load of the radiation resistance sheet. Therefore, a stiffness of a certain level is required. The supporting unit 30 requires a stiffness enough to endure a compressive stress from the plate member and an external impact.

In an embodiment, the plate member and the side frame may have the highest stiffness so as to prevent deformation caused by the vacuum pressure. The supporting unit, particularly, the bar may have the second highest stiffness. The radiation resistance sheet may have a stiffness that is lower than that of the supporting unit but higher than that of the conductive resistance sheet. Lastly, the conductive resistance sheet may be made of a material that is easily deformed by the vacuum pressure and has the lowest stiffness. Even when the porous material 33 is filled in the vacuum space part 50, the conductive resistance sheet may have the lowest stiffness, and the plate member and the side frame may have the highest stiffness.

As described above, various resin materials may be applied to the supporting unit 30. Particularly, a PPS may be used. However, a resin containing a large amount of PPS may have an advantage in that outgassing is low, but have a limitation in that moldability is poor due to high viscosity in a liquid state. In this case, as the molded supporting unit is changed in shape when designed, damage and shape change may occur when parts are coupled to each other.

Hereinafter, various specific examples of the supporting unit, which are capable of solving the above limitations, are proposed.

Figure 9:
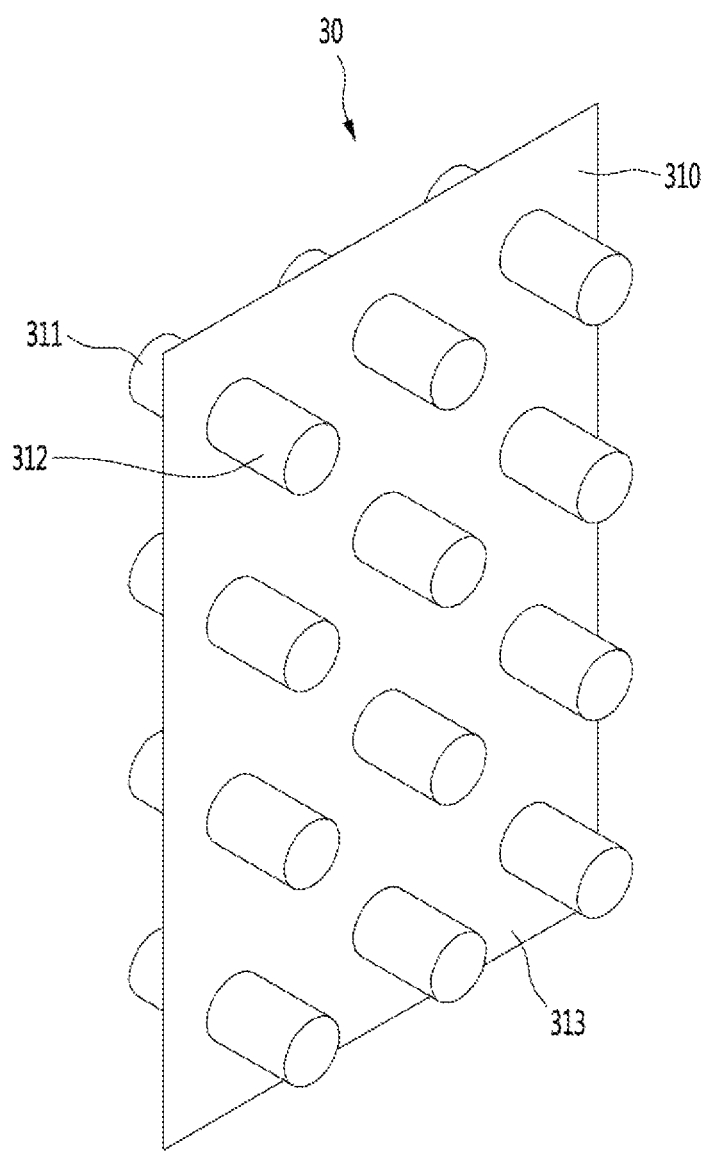
FIG. 9 is a schematic perspective view of a supporting unit according to an embodiment.

FIG. 9 is a schematic perspective view of a supporting unit according to an embodiment. Referring to FIG. 9, a supporting unit 30 (support) includes a non-lattice support 310 manufactured in a planar shape, i.e., a two-dimensional planar structure and a left (first) bar 311 and a right (second) bar 321, which respectively protrude from left (first) and right (second) surfaces of the non-lattice support 310. The left bar 311 and the right bar 312 may have a same length. Thus, it is understood that the non-lattice support 310 is disposed between the left bar and the right bar.

An injection liquid introduced into any point of a molding frame may widely flow through an inner empty space of the non-lattice support 310. In addition, as each of the left bar 311 and the right bar 312 has a length less than a half of a width of the inner space of the vacuum adiabatic body, the injection liquid may smoothly flow in the molding frame constituting the left bar 311 and the right bar 312. In a case of the bar 31 having a length equal to a width of an inner space of the vacuum adiabatic body, it may be easily understood by comparison with a case in which injection liquid does not reach an end of the bar 31, and a desired shape of the bar 31 may not be obtained when a flow distance of the injection liquid becomes long. If the width of the vacuum adiabatic body is maintained small enough, the non-lattice support 310 need not be provided in the middle of the vacuum adiabatic body. However, the shape of the bar should be provided in a desired shape. For the flow of the injection liquid, the width of the bar decreases toward the end.

The non-lattice support 310 may be molded together with the left bar 311 and the right bar 312. The non-lattice support 310 is a two-dimensional plane and has no vacant area. A coating surface 313 may be provided on at least one outer surface of two outer surfaces of the non-lattice support 310. A metal material having low emissivity may be applied to the coating surface 313 to perform a function of the radiation resistance sheet. Aluminum may be used as the metal material.

The coating surface 313 may be performed as one process when the non-lattice support 310 is mass-produced. Thus, the function of the radiation resistance sheet 32 may be realized through a simple process.

According to embodiments, there is an advantage that it is not necessary to provide a separate structure for manufacturing the radiation resistance sheet, fixing the radiation resistance sheet, providing a separator structure for installing the radiation resistance sheet, and installing the radiation resistance sheet when the vacuum adiabatic body is manufactured.

The non-lattice support 310 is a part having a predetermined thickness. Thus, more expensive resin material, such as PPS, is introduced, and outgassing further increases. Another embodiment is proposed in consideration of this limitation.

According to embodiments, in providing the supporting unit 30, it is possible to eliminate inconvenience that the bars 31 extending from the pair of facing support plates 35 are engaged with each other. That is, in order to provide a female structure and a male structure at ends of the facing bars 31 to be coupled to each other, numerous aligning structures and insertion of the aligned structures are required. On the other hand, in the present embodiment, as the left bar 311 and the right bar 312 are manufactured on both sides of the support, there is no need to separately align or couple the bars.

When the left bar 311 and the right bar 312 contact the plate members 10 and 20, an unevenness may occur on the plate member. Thus, to reduce unevenness, a planarization plate may be provided. A detailed configuration of the planarization plate will be described hereinafter.

These advantages may be similarly implemented in all of the following embodiments.

Figure 10:
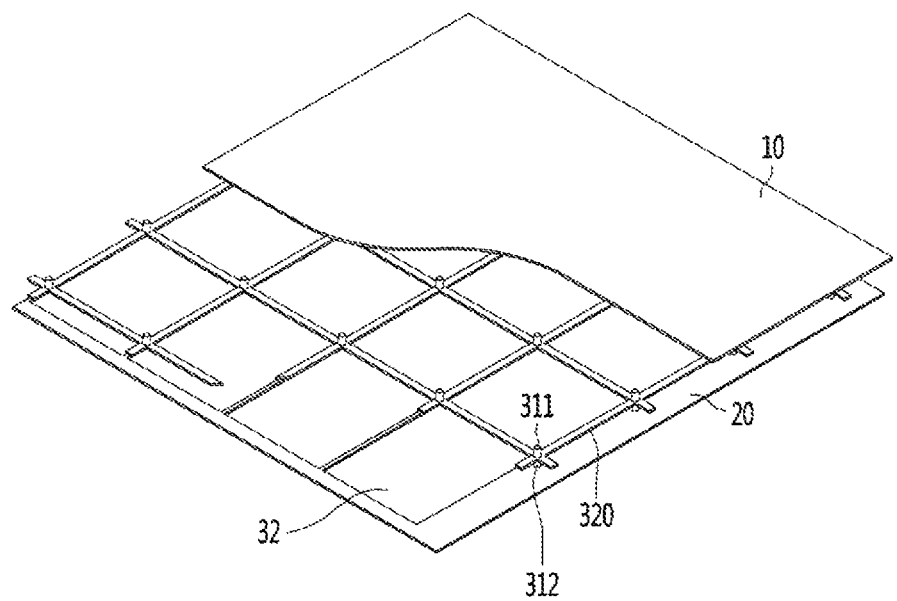
FIG. 10 is a perspective view of a supporting unit according to another embodiment.

FIG. 10 is a perspective view of a supporting unit according to another embodiment. Referring to FIG. 10, a supporting unit 30 includes a lattice support 320 manufactured in a two-dimensional lattice structure and a left (first) bar 311 and a right (second) bar 321, which respectively protrude to left (first) and right (second) sides of the non-lattice support 320. The left bar 311 and the right bar 312 may be provided at an intersection of lattices for reinforcement of strength. The left bar and the right bar may function as the supporting unit 30 by directly or indirectly contacting the plate members 10 and 20.

The radiation resistance sheet 32 may be supported by the lattice support 320. The radiation resistance sheet 32 may be supported by the lattice support 320, and both left and right sides of the radiation resistance sheet 32 face the plate members 10 and 20 to resist to radiation heat transfer.

A center of each lattice of the lattice support 320 is empty, and no resin is used. Therefore, an amount of resin used may be reduced, and outgassing may be reduced.

Figure 11A:
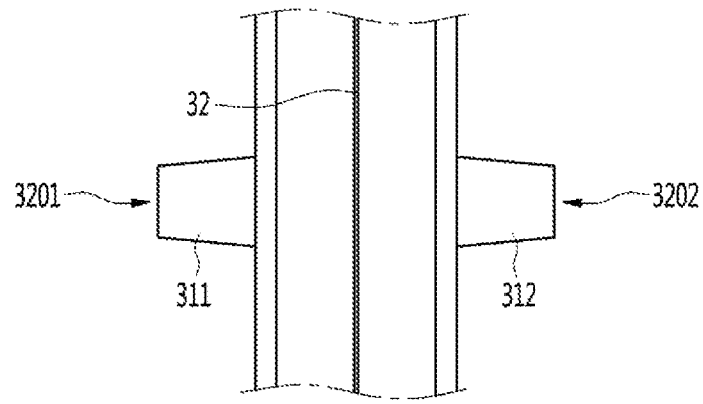

The radiation resistance sheet 32 may be supported by the lattice support 320 through various methods. FIG. 11A illustrates a coupling manner, and FIG. 11B illustrates an insert injection manner.

First, referring to FIG. 11A, a left (first) lattice support 3201 and a right (second) lattice support 3202 are disposed to be symmetrical to each other, and the radiation resistance sheet 32 is inserted between the left and right lattice supports 3201 and 3202. Thereafter, the left lattice support 3201 and the right lattice support 3202 are coupled to each other. The radiation resistance sheet 32 is fixed between the left lattice support 3201 and the right lattice support 3202. Coupling between the left lattice support 3201 and the right lattice support 3202 may be realized by fusing portions of the two parts or coupling the two parts using a fixing tool.

Figure 11B:
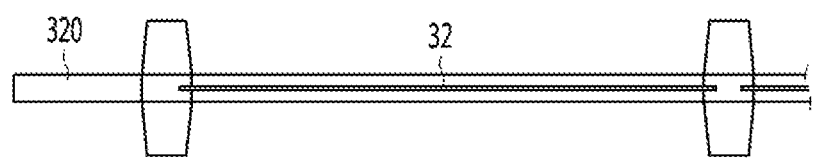

Referring to FIG. 11B, in a state in which the radiation resistance sheet 32 is inserted into the molding frame, an injection liquid is injected into the molding frame. The radiation resistance sheet 32 forms a body with the lattice support 320 as the injection liquid in the molding frame is cured.

According to the present embodiment, the radiation resistance sheets may be conveniently handled in batches at a manufacturing stage of parts. In addition, an amount of resin to be used may be reduced.

The method of coupling the radiation resistance sheet 32 to the non-lattice support may be variously proposed.

FIG. 12 is a view illustrating an example in which the radiation resistance sheet is fixed to a left bar and/or a right bar according to an embodiment. Referring to FIG. 12, the radiation resistance sheet 32 may be inserted to be fixed to the left bar 311 and the right bar 312. A hole may be previously processed in the radiation resistance sheet 32, and the bar may be inserted into the hole.

When the left bar 311 and the right bar 312 are inserted into the hole, a support protrusion 323 may be provided on each of the left bar 311 and the right bar 312 to prevent the radiation resistance sheet from being separated due to oscillation even if vibration or impact occurs. To secure fluidity of the injection liquid, each of the left bar 311 and the right bar 312 may be provided with a thinner section toward an end thereof. Thus, the radiation resistance sheet 32 may be prevented from being pulled out by being caught by the support protrusion 323 after radiation resistance sheet 32 passes over the support protrusion 323.

In the present embodiment, the radiation resistance sheet may be deformed or damaged while the radiation resistance sheet is forcibly inserted onto the bar. Thus, there is a limitation that the operator has to pay more attention. A method for solving this limitation is proposed in FIG. 13.

FIGS. 13A-13D are plan views illustrating an example in which the radiation resistance sheet is fixed to the bar according to another embodiment. First, referring to FIGS. 13A-13D, holes 330 each of which has a predetermined shape and into which the bar is inserted are defined in the radiation resistance sheet 32. The holes 330 are symmetrical to each other in a plurality of directions.

A round support piece 331 smoothly protruding to contact the left bar 311 and the right bar 312, and a groove 334 allowing the round support piece 331 to be smoothly bent are provided in an edge of the hole 330.

An end of the round support piece 331 has a rounded shape. According to this shape, when the bar is inserted into the hole of the radiation resistance sheet, damage to the bar may be prevented. The round support piece 331 may be more smoothly deformed by the groove 334.

The lattice support 320 and the bar 311 are observed inside of the hole 330.

Referring to FIGS. 13A-13D, holes 330 each of which has a predetermined shape and into which the bar is inserted are defined in the radiation resistance sheet 32. The holes 330 are symmetrical to each other in a plurality of directions.

A wide support piece 332 including a linear holding part or portion 333 and having a wide contact length to each of the left bar 311 and the right bar 312 is provided at the edge of the hole 330. The linear holding part 333 may have an arc shape similar to an outer appearance of each of the bars 311 and 312. Thus, the bar may be supported at a wide interval to stably support the inserted radiation resistance sheet 32 without being separated. A groove 334 allowing the wide support piece 332 to be smoothly bent may be provided.

Referring to FIG. 13C, although the holes are symmetrical to each other in a plurality of directions like the above-described holes, a thick cross-shaped hole 336 having a thick cross shape is provided. When the bars 311 and 312 are inserted into the cross-shaped hole 336, a cusp (flap) 338 may spear and hold the bar. Thus, the fixed position of the radiation resistance sheet may be more stably maintained.

A small cross-shaped hole 337 having a shape corresponding to the thick cross-shaped hole 336 may be provided in FIG. 13D. When comparing the thick cross-shaped hole 336 with the small cross-shaped hole 337, it is the same that the cusp 338 is provided. However, an area at which a contact piece 339 contacts the bar may be smaller in the thick cross-shaped hole 337.

As described above, as the contact area of the contact piece is reduced, the heat transfer between the radiation resistance sheet and the bar may be further reduced.

As illustrated in FIGS. 12 and 13A-13D, the radiation resistance sheet 32 may be fixed in a manner directly mounted on the bar 31. The support protrusion 323 and the piece-shaped members (shaped holes) 331, 332, and 339 may be applied to each other in a redundant manner.

A position of the radiation resistance sheet 32 may be directly fixed to the interval between the supports 310 and 320 and the plate members 10 and 20. Hereinafter, details will be described with reference to the accompanying drawings.

Figure 14:
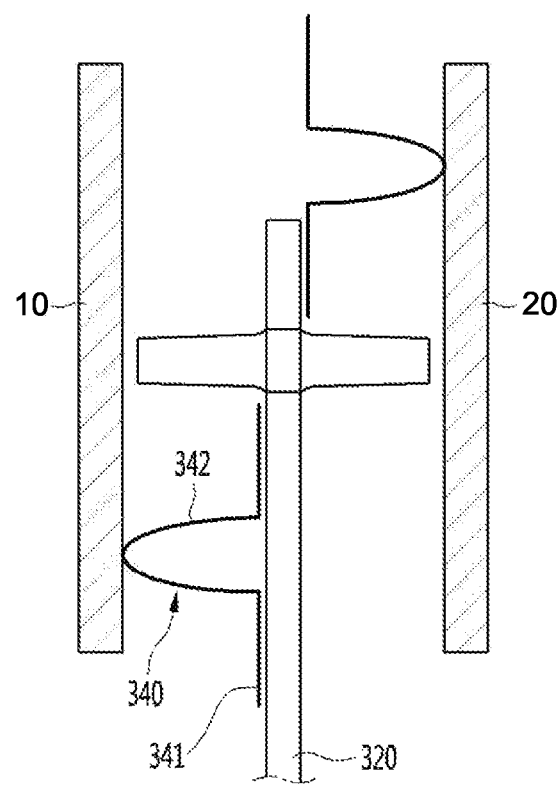
FIGS. 14 and 15 are views for explaining a self-standing type radiation resistance sheet.
Figure 15:
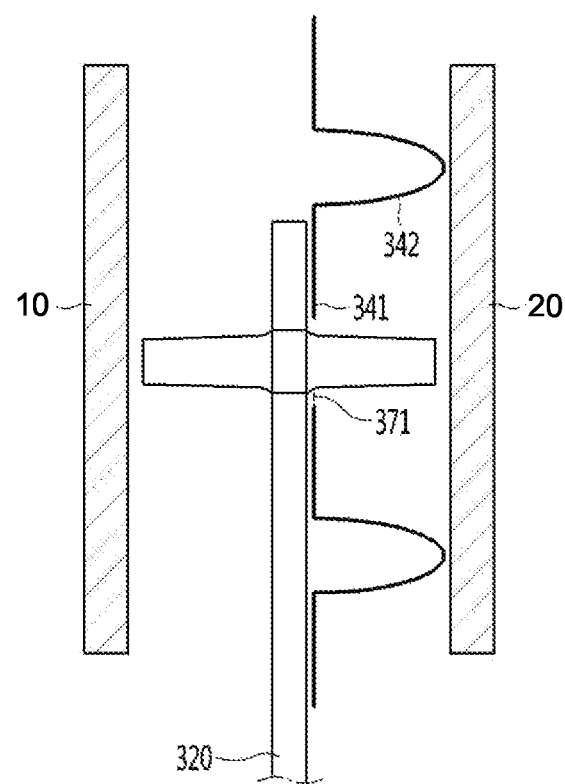

FIGS. 14 and 15 are views for explaining a self-standing type radiation resistance sheet. Referring to FIG. 14, the self-standing type radiation resistance sheet may be provided in a spacing part (space) between the lattice support 320 and the plate members 10 and 20.

To allow the self-standing type radiation resistance sheet 340 to stand up by itself, the self-standing type radiation resistance sheet 340 includes a sheet base 341 having a two-dimensional wide plate shape and a sheet protrusion 342 protruding from the sheet base 341. The sheet protrusion 342 may be provided on the plate-shaped sheet through press processing. The sheet protrusion 342 and the sheet base 341 may be integrally provided.

The sheet base 341 may contact the lattice support 320, and the sheet protrusion 342 may contact any member toward the plate member 10, and thus, be supported in its position. To prevent the self-standing type radiation resistance sheet 340 from moving along the lattice support 320, a through-hole 371, through which the bars 311 and 312 pass, may be further provided. The self-standing type radiation resistance sheet 340 may be provided on all left and right (first and second) sides of the lattice support 320 to improve an effect of radiation resistance.

The self-standing type radiation resistance sheet 340 may be made of a metal material, and thus, be high in thermal conductivity. When the self-standing type radiation resistance sheet 340 directly contacts the plate members 10 and 20, heat loss may increase. To solve this limitation, a heat conduction prevention tool 341 may be further provided at a portion at which the self-standing type radiation resistance sheet 340 contacts the plate members 10 and 20.

Referring to FIG. 15, like FIG. 14, it is seen that the self-standing type radiation resistance sheet 340 is disposed on only any one side of the lattice support 320. It is seen that the bar 312 is inserted into the through-hole 371 to prevent the self-standing type radiation resistance sheet 340 from moving in a vertical direction or a vertical direction with respect to the ground in the drawings.

It is seen that the bars 312 and 311 protrude outward in all of the lattice support 310 and the non-lattice support 320. Each of the bars 311 and 312 is a small part made of a resin material. Thus, the bars 311 and 312 may be easily damaged during storage and transport. When the bars 311 and 312 are mounted on the vacuum adiabatic body, the bars 311 and 312 may be deformed due to collision with other parts.

An insertion guide may be coupled to the outside of each of the bars 311 and 312 in consideration of this limitation. The insertion guide may prevent the bars 311 and 312 from being deformed and damaged when the supporting unit 30 is inserted between the plate members 10 and 20. The insertion guide may protect the bar during storage and transport.

Figure 16:
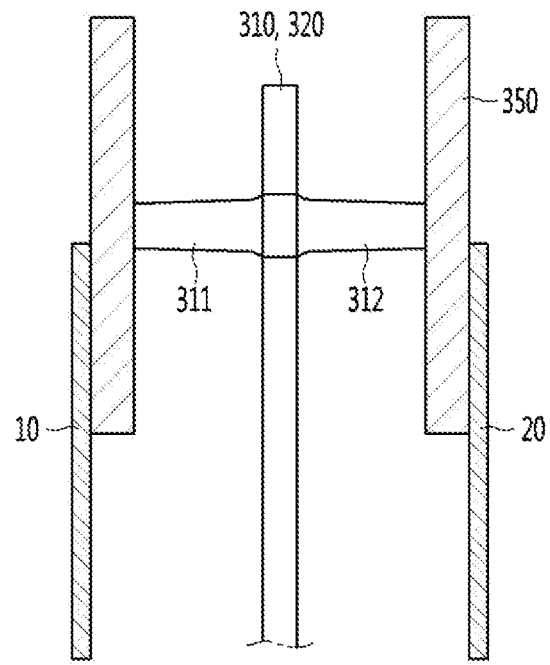
FIG. 16 is a view for explaining an insertion guide.

FIG. 16 is a view for explaining the insertion guide. Referring to FIG. 16, the insertion guide 350 is fixed to the plurality of bars 311 and 312 extending to both sides of the supports 310 and 320. As described above, the insertion guide 350 may prevent the bar from being damaged when the supporting unit is slidably inserted between the plate members and prevent the bar from being damaged during the storage and the transport.

In addition, when vacuum exhaust is performed in a state in which the supporting unit 30 is mounted, any one bar may be prevented from being locally damaged due to partial concentration of load. That is, a generally uniform load may be applied by the insertion guide 350 to prevent the bar from buckling. The bars 311 and 312 may be seated in a groove corresponding to the insertion guide 350. In this case, buckling may be more reliably prevented.

The insertion guide 350 may be inserted into the spacing part between the plate members 10 and 20. To realize the smooth insertion, various surface treatments may be performed on an outer surface of the insertion guide 350, i.e., a surface at which the insertion guide faces the plate members 10 and 20.

Figure 17:
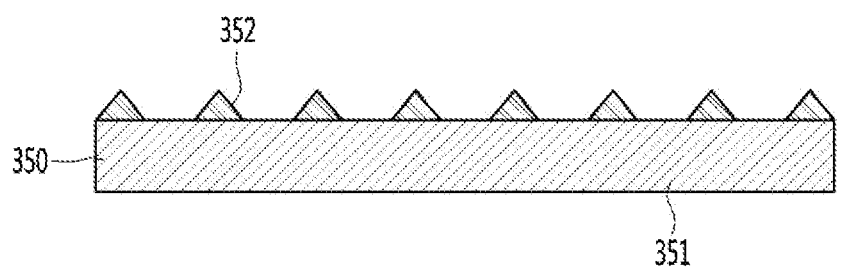
FIGS. 17 and 18 are views illustrating an example of surface treatment.
Figure 18:
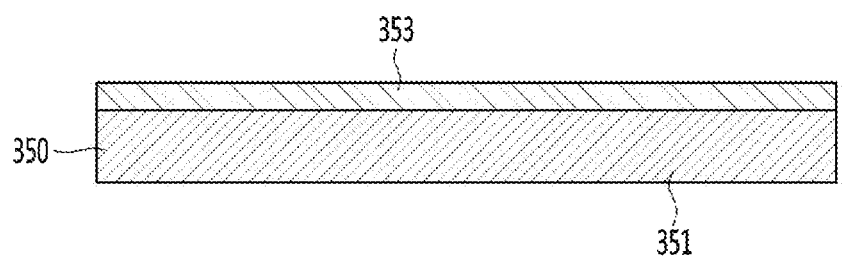

FIGS. 17 and 18 are views illustrating an example of the surface treatment.

Referring to FIG. 17, the insertion guide 350 may have an unevenness 352 on the guide frame 351 and the outer surface of the guide frame 351, i.e., surfaces facing the plate members 10 and 20. The unevenness 352 may reduce friction force on an inner surface of each of the plate members 10 and 20 and the outer surface of the insertion guide 350 and allow the insertion guide 350 to be smoothly inserted by small deformation of the unevenness.

Referring to FIG. 18, the insertion guide 350 may have a coating surface 353 on the outer surface of the guide frame 351, i.e., a coating surface 353 facing the plate members 10 and 20. The coating surface 353 may reduce friction force on an inner surface of each of the plate members 10 and 20 and the outer surface of the insertion guide 350 and allow the insertion guide 350 to be smoothly inserted. The coating surface may be Teflon coated.

A fitting groove into which the bar is fitted may be provided in the guide frame 351. In a state in which at least several bars are fitted into the fitting groove, transport and storage may be performed. Of course, all the bars may be fitted into the corresponding grooves or holes to prevent the bar from being damaged.

Figure 19:
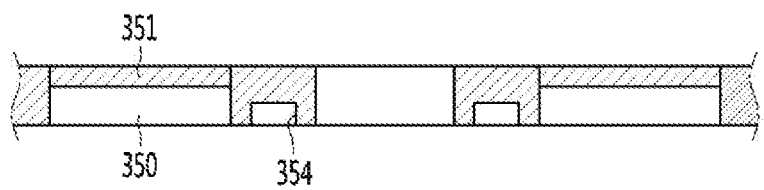
FIG. 19 is a cross-sectional view illustrating further another example of the insertion guide.

FIG. 19 is a cross-sectional view illustrating further another example of the insertion guide. Referring to FIG. 19, the insertion guide 350 may not be provided in a flat plate shape but be provided in a predetermined structure having a frame. That is, the fitting groove 354 may be provided in the guide frame 351 as a mesh structure having a lattice shape or a frame. A reinforcing structure may be provided at a portion, in which the fitting groove 354 is provided, in a manner in which the frame reinforces a thickness. According to the guide frame 351 provided as the mesh structure, an amount of resin to be used may be reduced.

Figure 20:
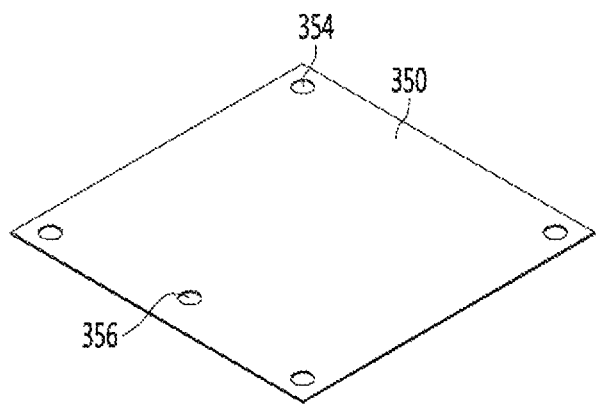
FIG. 20 is a view illustrating a fitting groove of the insertion guide.

FIG. 20 is a view illustrating the fitting groove of the insertion guide. Referring to FIG. 20, a plurality of fitting grooves 354 may be provided in an edge of the insertion guide 350 so that the bars 311 and 312 are coupled.

As the bar is coupled to the fitting groove 354, the supporting unit may be provided as one body. A seat groove 356 for preventing the bar from buckling may be provided in a portion on which the bar is disposed. The seat groove 356 may not affect coupling of the bar and the insertion guide, but it is possible to prevent the bar from twisted to prevent the bar from buckling. It is understood that a single seat groove 356 is provided as an example, but a plurality of seat grooves 356 is provided.

The bars 311 and 312 may directly contact the plate members 10 and 20 to support the interval between the plate members. However, when the bar directly contacts the plate member, the plate member may be bent by force due to a high vacuum pressure. This phenomenon does not greatly affect the inside of the vacuum adiabatic body, but the bending that occurs on the outer surface of the vacuum adiabatic body may cause user dissatisfaction. A planarization plate may be further provided in the supporting unit to prevent this phenomenon from occurring and to achieve planarization of the plate member.

Figure 21:
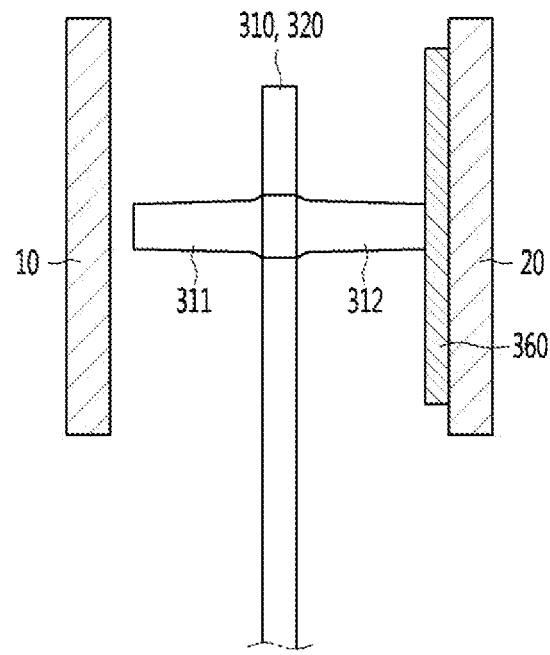
FIG. 21 is a view for explaining a supporting unit in which a planarization plate is provided.

FIG. 21 is a view for explaining the supporting unit in which a planarization plate is provided. Referring to FIG. 21, planarization plate 360 is disposed on an outer surface of each of the supports 310 and 320, i.e., the outside of the right bar 312. The planarization plate 360 may be disposed in a spacing part (space) between the right bar 312 and the second plate member 20.

An operation of the planarization plate 360 will be described. When an end of the right bar 312 directly contacts the second plate member 20, the second plate member 20 may be recessed inward to be deformed using a portion between the right bar 312 and the adjacent different right bar 312 as a support point. This is done because a large force is applied to the support point of the right bar 312.

Due to this phenomenon, deformation of the second plate member 20 may be reduced by allowing the mesh shape or plate shape of the planarization plate 360 to be supported by the force. The coupling between the planarization plate 360 and the bar may be provided in a manner similar to the insertion guide 350.

However, unlike that the seat groove 356 and the fitting groove 354 are provided different from each other, ends of all the bars may uniformly contact the planarization plate 360. According to the above-described constituents, uniform force may be applied to all the bars to prevent the bars from being damaged due to a concentration of force.

The planarization plate 360 and the bar 312 may uniformly contact each other. However, the bar 312 may not be coupled to the planarization plate 360 in a manner in which the bar 312 is inserted into the groove of the planarization plate 360. That is, as the number of coupled portions increases, the coupling process may be troublesome and difficult. For this, the number of coupling grooves between the planarization plate 360 and the bar 312 may be minimized. For example, the coupling groove may be provided in only a portion of an edge of the planarization plate 360, and the bar 312 may be coupled to only the coupling groove to conveniently perform the coupling therebetween and improve work convenience through temporary assembly.

The planarization plate may be similarly provided with respect to the first plate. However, the inside of the vacuum adiabatic body is not a part of great interest to the user, so there is no great need.

Figure 22:
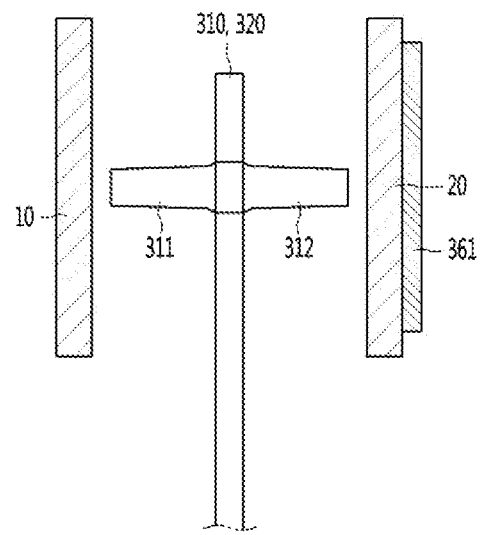
FIG. 22 is a view for explaining an example in which an outer cover is disposed outside a plate member according to an embodiment.

FIG. 22 is a view for explaining an example in which an outer cover is disposed outside of the plate member according to an embodiment. If there is a limitation such as a narrow internal width of the vacuum adiabatic body, a planarization plate may not be provided. In this case, the second plate member may be bent.

Referring to FIG. 22, an outer cover 361 may be further provided on an outer surface of the second plate member. The outer cover may cover the bent portion to further provide an elegant surface to the user. According to the outer cover, as a separate planarization plate does not need to be coupled to the bar at the portion on which the outer cover is disposed, the supporting unit may be conveniently manufactured.

Although the outer cover and the planarization plate may be used together, it is not necessary to provide the two covers together in a same planar area. Thus, the area on which the planarization plate is easily installed may not be provided with the outer cover, and the area on which the outer cover is easily provided may not be provided. The convenience of manufacturing the supporting unit may be further improved using the planarization plate and the outer cover in place.

Figure 23:
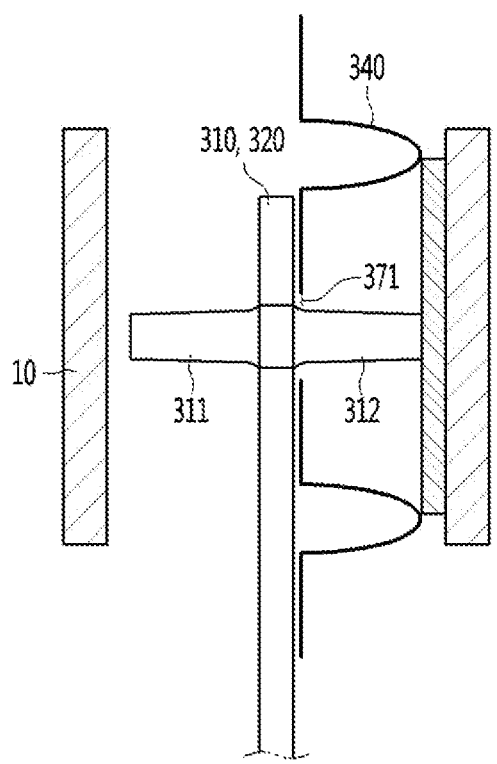
FIG. 23 is a view for explaining another function of the planarization plate.

FIG. 23 is a view for explaining another function of the planarization plate. Referring to FIG. 23, an end of the sheet protrusion 342 of the self-standing type radiation resistance sheet 340 may contact the planarization plate 360. In this case, the planarization plate 360 may further perform the function of the conduction prevention tool 341. In this case, the planarization plate 360 may be made of a resin material.

Hereinafter, a vacuum pressure determined depending on an internal state of the vacuum adiabatic body will be discussed. As already described above, a vacuum pressure is to be maintained inside of the vacuum adiabatic body so as to reduce heat transfer. The vacuum pressure is maintained as low as possible so as to reduce the heat transfer.

The vacuum space may resist heat transfer by only the supporting unit 30. Here, a porous material 33 may be filled within the supporting unit inside of the vacuum space 50 to resist to the heat transfer. A case in which only the supporting unit is applied will be described.

Figure 24:
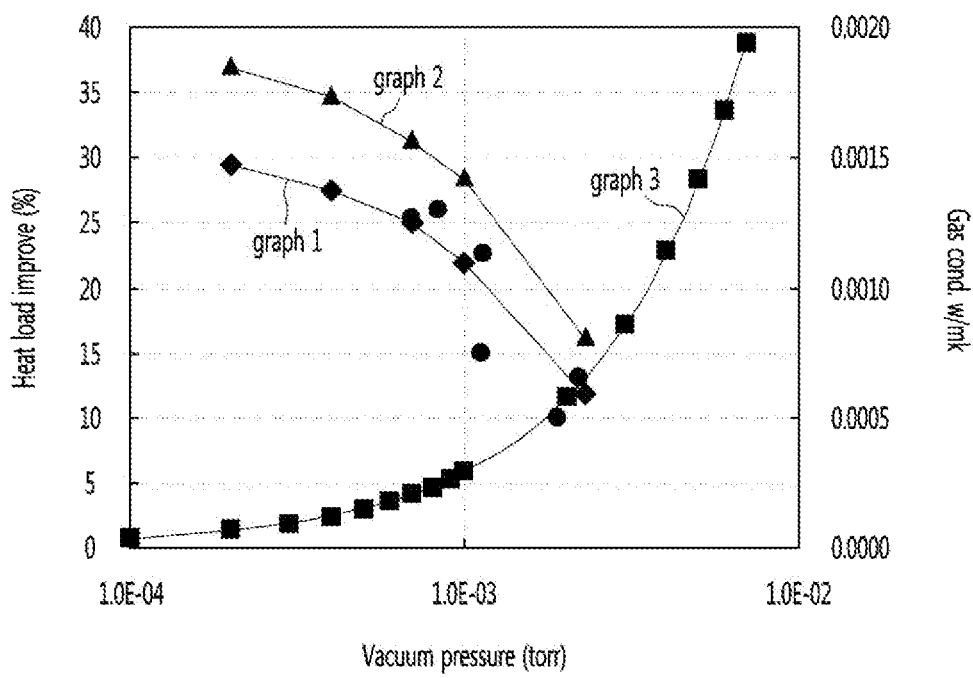
FIG. 24 is a graph illustrating a variation in adiabatic performance and a variation in gas conductivity according to a vacuum pressure by applying a simulation.

FIG. 24 illustrates graphs showing changes in adiabatic performance and changes in gas conductivity with respect to vacuum pressures by applying a simulation. Referring to FIG. 24, it may be seen that, as the vacuum pressure is decreased, i.e., as the vacuum degree is increased, a heat load in the case of only the main body (Graph 1) or in the case where the main body and the door are joined together (Graph 2) is decreased as compared with that in the case of the typical product formed by foaming polyurethane, thereby improving adiabatic performance. However, it may be seen that a degree of improvement of the adiabatic performance is gradually lowered. Also, it may be seen that, as the vacuum pressure is decreased, gas conductivity (Graph 3) is decreased. However, it may be seen that, although the vacuum pressure is decreased, a ratio at which the adiabatic performance and the gas conductivity are improved is gradually lowered. Therefore, the vacuum pressure is decreased as low as possible. However, it takes a long time to obtain excessive vacuum pressure, and much cost is consumed due to excessive use of a getter. In the embodiment, an optimal vacuum pressure is proposed from the above-described point of view.

Figure 25:
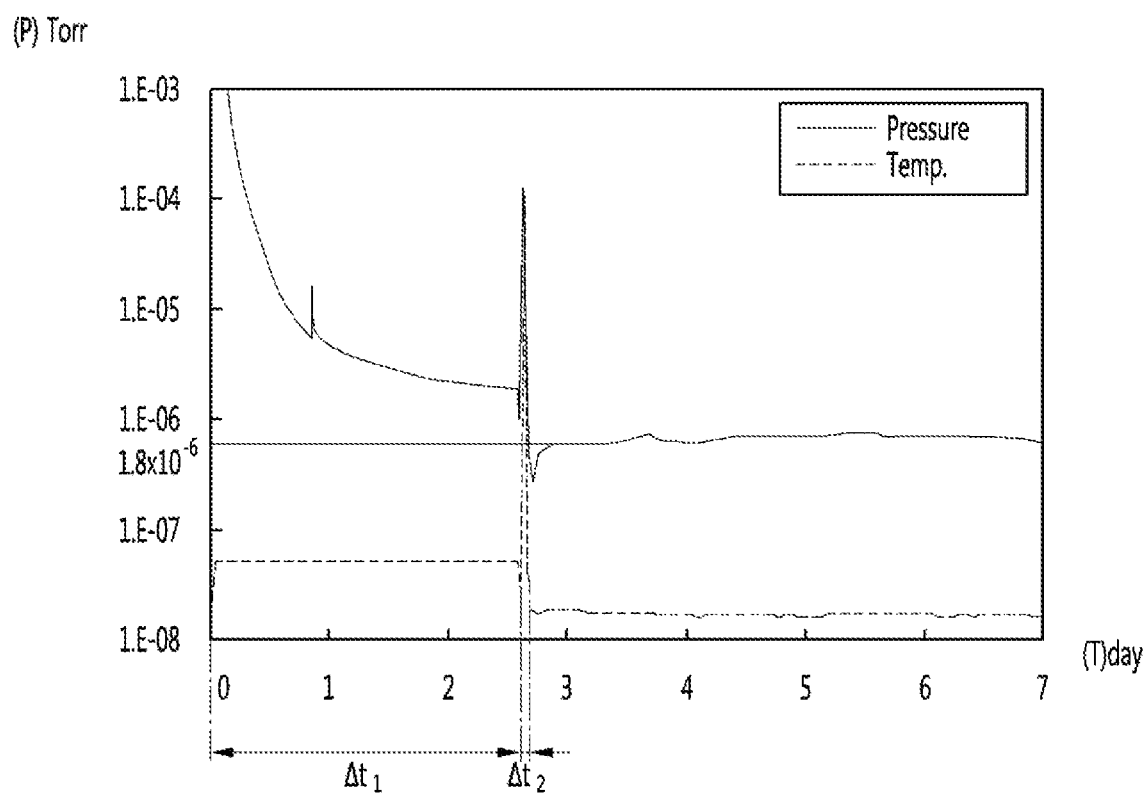
FIG. 25 is a graph illustrating results obtained by observing a time and a pressure in a process of exhausting an inside of the vacuum adiabatic body when a supporting unit is used.

FIG. 25 is a graph illustrating results obtained by observing a time and a pressure in a process of exhausting the inside of the vacuum adiabatic body when a supporting unit is used. Referring to FIG. 25, in order to create the vacuum space part 50 to be in the vacuum state, a gas in the vacuum space part 50 is exhausted by a vacuum pump while evaporating a latent gas remaining in parts of the vacuum space part 50 through baking. However, if the vacuum pressure reaches a certain level or more, there exists a point at which the level of the vacuum pressure is not increased any more ($\Delta T1$). After that, the getter is activated by disconnecting the vacuum space part 50 from the vacuum pump and applying heat to the vacuum space part 50 ($\Delta T2$). If the getter is activated, the pressure in the vacuum space part 50 is decreased for a certain period of time, but then normalized to maintain a vacuum pressure of a certain level. The vacuum pressure that maintains the certain level after activation of the getter is approximately $1.8 \times 10^{-6}$ Torr.

In the embodiment, a point at which the vacuum pressure is not substantially decreased any more even though the gas is exhausted by operating the vacuum pump is set to a lowest limit of the vacuum pressure used in the vacuum adiabatic body, thereby setting a minimum internal pressure of the vacuum space part 50 to $1.8 \times 10^{-6}$ Torr.

Figure 26:
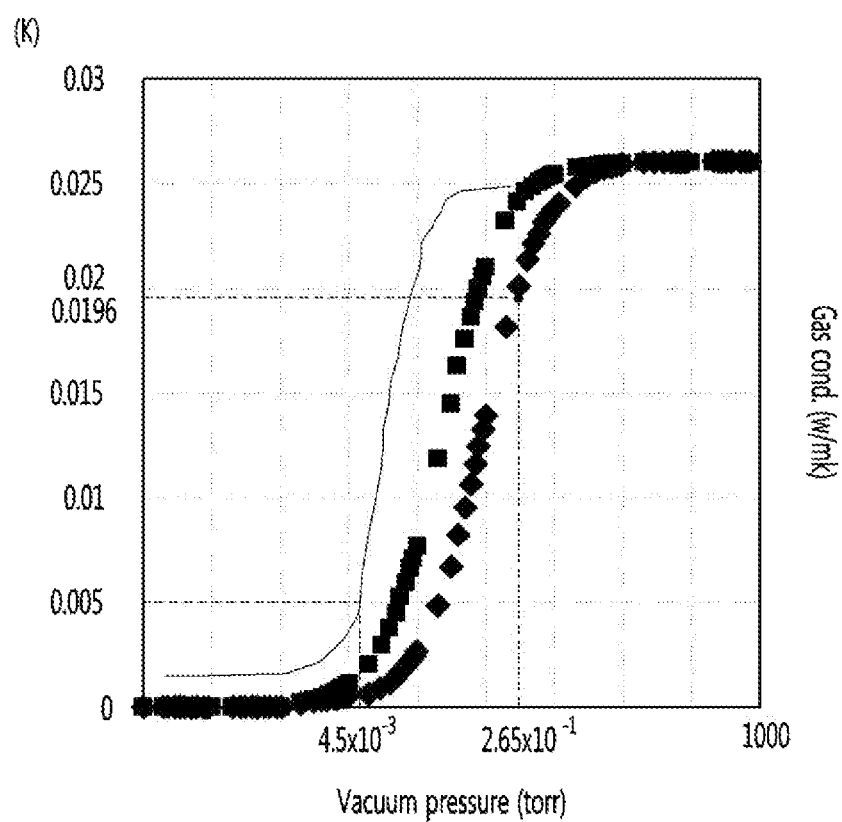
FIG. 26 is a graph illustrating results obtained by comparing a vacuum pressure with gas conductivity.

FIG. 26 is a graph obtained by comparing a vacuum pressure with gas conductivity. Referring to FIG. 26, gas conductivities with respect to vacuum pressures depending on sizes of a gap in the vacuum space part 50 are represented as graphs of effective heat transfer coefficients (eK). Effective heat transfer coefficients (eK) were measured when the gap in the vacuum space part 50 has three sizes of 2.76 mm, 6.5 mm, and 12.5 mm. The gap in the vacuum space part 50 is defined as follows. When the radiation resistance sheet 32 exists inside of the vacuum space part 50, the gap is a distance between the radiation resistance sheet 32 and the plate member adjacent thereto. When the radiation resistance sheet 32 does not exist inside of the vacuum space part 50, the gap is a distance between the first and second plate members.

It was seen that, as the size of the gap is small at a point corresponding to a typical effective heat transfer coefficient of 0.0196 W/mK, which is provided to an adiabatic material formed by foaming polyurethane, the vacuum pressure is $2.65 \times 10^{-1}$ Torr even when the size of the gap is 2.76 mm. It was seen that the point at which reduction in adiabatic effect caused by gas conduction heat is saturated even though the vacuum pressure is decreased is a point at which the vacuum pressure is approximately $4.5 \times 10^{-3}$ Torr. The vacuum pressure of $4.5 \times 10^{-3}$ Torr may be defined as the point at which the reduction in adiabatic effect caused by gas conduction heat is saturated. Also, when the effective heat transfer coefficient is 0.1 W/mK, the vacuum pressure is $1.2 \times 10^{-2}$ Torr.

When the vacuum space part 50 is not provided with the supporting unit but provided with the porous material, the size of the gap ranges from a few micrometers to a few hundreds of micrometers. In this case, the amount of radiation heat transfer is small due to the porous material even when the vacuum pressure is relatively high, i.e., when the vacuum degree is low. Therefore, an appropriate vacuum pump is used to adjust the vacuum pressure. The vacuum pressure appropriate to the corresponding vacuum pump is approximately $2.0 \times 10^{-4}$ Torr. Also, the vacuum pressure at the point at which the reduction in adiabatic effect caused by gas conduction heat is saturated is approximately $4.7 \times 10^{-2}$ Torr. Also, the pressure where the reduction in adiabatic effect caused by gas conduction heat reaches the typical effective heat transfer coefficient of 0.0196 W/mK is 730 Torr.

When the supporting unit and the porous material are provided together in the vacuum space part, a vacuum pressure may be created and used, which is middle between the vacuum pressure when only the supporting unit is used and the vacuum pressure when only the porous material is used.

In the description of embodiments, a part for performing the same action in each embodiment of the vacuum adiabatic body may be applied to another embodiment by properly changing the shape or dimension of foregoing another embodiment. Accordingly, still another embodiment may be easily proposed. For example, in the detailed description, in the case of a vacuum adiabatic body suitable as a door-side vacuum adiabatic body, the vacuum adiabatic body may be applied as a main body-side vacuum adiabatic body by properly changing the shape and configuration of a vacuum adiabatic body.

The vacuum adiabatic body proposed in embodiments may be applied to refrigerators. However, the application of the vacuum adiabatic body is not limited to the refrigerators, and may be applied in various apparatuses, such as cryogenic refrigerating apparatuses, heating apparatuses, and ventilation apparatuses.

According to embodiments, the vacuum adiabatic body may be industrially applied to various adiabatic apparatuses. The adiabatic effect may be enhanced, so that it is possible to improve energy use efficiency and to increase effective volume of an apparatus.

The invention claimed is:

1. A vacuum adiabatic body, comprising:
   a first plate defining at least a portion of a wall for a first space;
   a second plate defining at least a portion of a wall for a second space having a second temperature different from a first temperature of the first space;
   a sealing that seals the first plate and the second plate to provide a third space having a third temperature between the first temperature and the second temperature, wherein the third space is a vacuum space;
   a support that maintains the third space;
   a heat resistance unit that reduces a heat transfer amount between the first plate and the second plate, the heat resistance unit comprising at least one radiation resistance sheet disposed in the third space; and
   an exhaust port through which a gas of the third space is exhausted, wherein the support comprises:

a main support having a two-dimensional planar structure and crossing the third space; and at least one first bar and at least one second bar, which respectively extend from both sides of the main support toward the first plate and the second plate, respectively, wherein the at least one radiation resistance sheet comprises an opening into which the at least one first bar and at least one second bar is inserted, and wherein an inner edge of the opening comprises a support piece configured to contact the at least one first bar and at least one second bar and a groove positioned adjacent to the support piece to allow the support piece to be bent.

2. The vacuum adiabatic body according to claim 1, wherein the at least one first bar and the at least one second bar have a same length.

3. The vacuum adiabatic body according to claim 1, wherein the main support has a non-lattice shape, and a coating surface coated with a metal having low emissivity is provided on both surfaces of the main support.

4. The vacuum adiabatic body according to claim 1, wherein the at least one radiation resistance sheet is supported by at least one of the at least one first bar or the at least one second bar.

5. The vacuum adiabatic body according to claim 4, wherein the opening comprises at least one cross-shaped opening, an inner edge of which contacts at least one of the at least one first bar or the at least one second bar, so that the position of the at least one radiation resistance sheet is fixed by the contact.

6. The vacuum adiabatic body according to claim 1, wherein the heat resistance unit further comprises:
a sheet base that crosses the vacuum space; and
at least one sheet protrusion that protrudes from the sheet base toward one of the first plate or the second plate.

7. The vacuum adiabatic body according to claim 6, wherein a conduction prevention tool is disposed between the at least one radiation resistance sheet, which is self-standing, and the one of the first plate or the second plate to prevent heat conduction from occurring.

8. The vacuum adiabatic body according to claim 1, wherein a planarization plate that prevents the first and second plates from being bent is disposed between the at least one first bar and the at least one second bar and the first plate and the second plate, respectively.

9. The vacuum adiabatic body according to claim 1, wherein at least one of the at least one first bar or the at least one second bar has a length less than a half of a width of the third space.

10. The vacuum adiabatic body according to claim 1, wherein the at least one first bar and the at least one second bar are disposed at positions facing each other on both sides of the main support and extend perpendicular to an extending direction of the main support.

11. The vacuum adiabatic body according to claim 1, wherein the support piece includes a rounded end.

12. A refrigerator, comprising:
a main body providing an internal space in which goods are stored;
a door configured to open and close the internal space;
a refrigeration cycle that supplies cold air to the internal space, the refrigeration cycle comprising:
  a compressor that compresses a refrigerant;
  a condenser that condenses the compressed refrigerant;
  an expansion valve that expands the condensed refrigerant; and
  an evaporator that evaporates the expanded refrigerant to dissipate heat, wherein the door or the main body comprises a vacuum adiabatic body, and wherein the vacuum adiabatic body comprises:
    a first plate defining at least a portion of a wall for a first space;
    a second plate defining at least a portion of a wall for a second space having a second temperature different from a first temperature of the first space;
    a sealing that seals the first plate and the second plate to provide a third space having a third temperature between the first temperature and the second temperature, wherein the third space is a vacuum space;
    an exhaust port through which a gas within the third space is exhausted;
    at least one radiation resistance sheet that reduces radiation heat transfer between the first plate and the second plate; and
    a support comprising
      a main support disposed in an inner space of the third space and provided as a two-dimensional planar structure, the main support including a first surface that faces the first plate and a second surface that faces the second plate;
      at least one first bar that extends from the main support toward the first plate; and
      at least one second bar that extends from the main support toward the second plate, wherein the at least one radiation resistance sheet comprises a first sheet provided on the first surface of the main support and a second sheet provided on the second surface of the main support, and wherein at least one of the first sheet or the second sheet includes a sheet base attached to the main support and a sheet protrusion configured to protrude from the sheet base and having a bent end to contact the one of the first plate or the second plate.

13. The vacuum adiabatic body according to claim 12, wherein at least one of the at least one first bar or the at least one second bar has a length less than a half of a width of the third space.

14. The refrigerator according to claim 12, wherein the at least one first bar includes a plurality of the first bars or the at least one second bar includes a plurality of second bars, wherein the main support connects at least two or more bars of the plurality of the first bars or the main support connects at least two or more bars of the plurality of the second bars.

15. The refrigerator according to claim 12, wherein the at least one radiation resistance sheet is unmovable along an extension direction of the plurality of first bars or the plurality of second bars by the at least one radiation resistance sheet being fixed to the main support, the plurality of first bars, or the plurality of second bars.

16. The refrigerator according to claim 12, wherein at least one first bar and at least one second bar are disposed between the first sheet and the second sheet.

17. The refrigerator according to claim 12, wherein the sheet base of the first sheet is attached to the first surface of the main support, and the sheet base of the second sheet is attached to the second surface of the main support.

* * * * *